United States Patent
Luqman et al.

(10) Patent No.: US 11,216,617 B2
(45) Date of Patent: Jan. 4, 2022

(54) METHODS, COMPUTER READABLE MEDIA, AND SYSTEMS FOR MACHINE TRANSLATION BETWEEN ARABIC AND ARABIC SIGN LANGUAGE

(71) Applicant: King Fahd University of Petroleum and Minerals, Dhahran (SA)

(72) Inventors: Hamzah Luqman, Dhahran (SA); Sabri A. Mahmoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/223,631

(22) Filed: Dec. 18, 2018

(65) Prior Publication Data

US 2020/0192982 A1    Jun. 18, 2020

(51) Int. Cl.
| | |
|---|---|
| G06F 40/40 | (2020.01) |
| G06F 40/30 | (2020.01) |
| G06F 40/211 | (2020.01) |
| G06F 40/242 | (2020.01) |
| G06F 40/247 | (2020.01) |
| G06F 40/253 | (2020.01) |
| G06F 40/268 | (2020.01) |

(52) U.S. Cl.
CPC ........... *G06F 40/30* (2020.01); *G06F 40/211* (2020.01); *G06F 40/242* (2020.01); *G06F 40/247* (2020.01); *G06F 40/253* (2020.01); *G06F 40/268* (2020.01)

(58) Field of Classification Search
CPC .................................. G06F 40/40; G06F 40/58
See application file for complete search history.

(56) References Cited

U.S. PATENT DOCUMENTS

| | | | | |
|---|---|---|---|---|
| 5,678,051 | A * | 10/1997 | Aoyama | G06F 40/58 704/2 |
| 6,477,239 | B1 * | 11/2002 | Ohki | G09B 21/009 348/14.01 |
| 8,726,148 | B1 * | 5/2014 | Battilana | G06F 40/274 715/234 |
| 10,726,211 | B1 * | 7/2020 | Wolfe | G10L 15/1822 |
| 2006/0069545 | A1 * | 3/2006 | Wu | G06F 40/151 704/8 |
| 2009/0119090 | A1 * | 5/2009 | Niu | G06F 40/44 704/1 |
| 2014/0207438 | A1 | 7/2014 | Liebermann | |
| 2017/0220562 | A1 * | 8/2017 | Yamauchi | G06F 40/289 |

(Continued)

FOREIGN PATENT DOCUMENTS

| | | |
|---|---|---|
| CN | 101877189 A | 11/2010 |
| WO | 2017/151019 A1 | 9/2017 |

OTHER PUBLICATIONS

Almohimeed, et al. ; Arabic Text to Arabic Sign Language Translation System for the Deaf and Hearing-Impaired Community ; Proceedings of the 2nd Workshop on Speech and Language Processing for Assistive Technologies ; pp. 101-109 ; Jul. 30, 2011 ; 9 Pages.

(Continued)

*Primary Examiner* — Daniel Abebe
(74) *Attorney, Agent, or Firm* — Oblon, McClelland, Maier & Neustadt, L.L.P.

(57) ABSTRACT

Methods, systems, and computer readable media for machine translation between Arabic language and Arabic Sign Language are described.

17 Claims, 22 Drawing Sheets

(56) References Cited

U.S. PATENT DOCUMENTS

2018/0052829 A1* 2/2018 Lee .................. G06F 40/268
2019/0213261 A1* 7/2019 Mochida ............. G06F 40/51

OTHER PUBLICATIONS

Mohandes ; Automatic Translation of Arabic Text to Arabic Sign Language ; AMIL Journal vol. 6 Issue 4 ; Dec. 2006 ; 5 Pages.
El-Gayyar, et al.; Translation from Arabic speech to Arabic Sign Language based on cloud computing ; Egyptian Informatics Jounral 17 ; pp. 295-303 ; 2016 ; 9 Pages.

* cited by examiner

| | | | |
|---|---|---|---|
| a | [ثلاثة][معلم][بنت] [bnt] [mElm] [vlAvp] [GIRL] [TEACHER] [THREE] | FSP* → | معلمات mElmAt "Teachers" |
| b | [مستشفى][كثير] [mst$fY] [kvyr] [HOSPITAL] [MUCH] | FSP → | مستشفيات mst$fyAt "hospitals" |
| c | [عصا]++ [ESA]++ [STICK]++ | FSP → | عصوات ESwAt "sticks" |
| d | [مدى]++ [mdY]++ [RANGE]++ | FSP → | مديات mdyAt "ranges" |
| e | [انشاء]++ [An$A']++ [CONSTRUCTION]++ | FSP → | انشاءات An$A'At "constructions" |
| f | [صحراء]++ [SHrA']++ [DESERT]++ | FSP → | صحراوات SHrAwAt "deserts" |
| g | [مصطفى]++ [mSTfY]++ [MUSTAFA]++ | MSP* → | مصطفون mSTfwn "Mustafas" |
| h | [محامي]++ [mHAmy]++ [LAWYER]++ | MSP → | محامون mHAmwn "lawyers" محامين mHAmyn "lawyers" |

FIG. 10

| ArSL | [قبل] [البكتيريا] ڧ-[انتشار] [من] [الجرح]<br>*[qbl] [AlbktyryA] f-[Ant$Ar] [mn] [AljrH]*<br>[BEFORE] [BACTERIA] [SPREAD]-V [FROM] [WOUND] |
|---|---|
| Arabic | انتشرت البكتيريا عبر الجرح<br>*Ant$rt AlbktyryA Ebr AljrH*<br>Bacteria spread through the wound |

FIG. 12

  English: I want to go
Gloss: WANT GO ME
(a) (b) (c)
FIG. 14

English : What is your name?

ASL gloss: $\overline{\text{NAME}}^{\text{Wh}}$ YOU

FIG. 15

| Arabic | تجنب الاغذية المسببة للإسهال<br>*tjnb AlAg\*yp Almsbbp ll<shAl*<br>Avoid foods that cause diarrhea |
|---|---|
| ArSL | [ممنوع] [اكل] [سبب] [اسهال]<br>*[mmnwE] [Akl] [sbb] [AshAl]*<br>[FORBIDDEN] [FOOD] [CAUSE] [DIARRHEA] |
| | [في] [اكل] [سبب] [اسهال] [أفضل] [وقف]<br>*[fy] [Akl] [sbb] [AshAl] [>fDl] [wqf]*<br>[IF] [FOOD] [CAUSE] [DIARRHEA] [BETTER] [STOP] |

FIG. 17

(a)
(b)
FIG. 18

| | Arabic Sentence | ArSL sentence |
|---|---|---|
| a | يرتبط الإدمان بمرض نقص المناعة<br>*yrtbT AlAdmAn bmrD nqS AlmnAEp*<br>Addiction is associated with AIDS | [ادمان] [علاقة] [مرض] [نقص مناعة]<br>*[AdmAn] [ElAqp] [mrD] [nqS mnAEp]*<br>[ADDICTION] [RELATION] [DISEASE] [AIDS] |
| b | يعاني الطفل من إعاقة السمعية منذ الولادة<br>*yEAny AlTfl mn AlAEAqh AlsmEyh mn\* AlwlAdh*<br>The child suffers from hearing impairment since birth | [طفل] [تألم] [اعاقة سمعية] [ولادة]<br>*[Tfl] [tAlm] [AEAqp smEyp] [wlAdp]*<br>[CHILD] [SUFFERS] [HEARING IMPAIRMENT] [BIRTH] |
| c | هل يعاني أحد أفراد أسرتك من الورم؟<br>*hl yEAny AHd AfrAd Asrtk mn Altwrm?*<br>Does anyone of your family suffer from tumor? | [؟] [الأحد] [$xS] [انت] [اسرة] [تألم] [ورم] [هل]<br>*[?] [AlAHd] [$xS] [Ant] [Asrp] [tAlm] [twrm] [hl]*<br>[?] [SUNDAY] [PERSON] [YOU] [FAMILY] [SUFFER] [TUMOR] [DOES] |

FIG. 19

| | Arabic reference | ArSL sentence | Output Arabic sentence |
|---|---|---|---|
| a | سينتشر السم في جسمك بعد ساعة<br>synt$r Alsm fy jsmk bEd sAEp<br>The poison will spread in your body after an hour. | [ساعة] [بعد] [السم]-[انتشر] [في] [انت$ار] [جسم]<br>[sAEp] [bEd] [Alsm] f-[Ant$Ar] [fy] [>nt] [jsm]<br>[HOUR] [AFTER] [POISON] V-[SPREAD] [IN] [YOU] [BODY] | سينتشر بعد ساعة السم في جسمك<br>synt$r bEd sAEh Alsm fy jsmk<br>The poison will spread in your body after an hour. |
| b | نستخدم أشعة الليزر لفتح شرايين القلب<br>nstxdm >$Ep Allyzr lftH $rAyn Alqlb<br>We use X-ray to open the arteries of the heart. | [نحن] ف-[استخدم] [>شع Allyzr] [السبب] ف-[فتح] [شريان]++ [القلب]<br>[nHn] f-[AstxdAm] [>$Ep Allyzr] [Alsbb] f-[ftH] [$ryAn]++ [Alqlb]<br>[WE] V-[USE] [X-RAY] [REASON] V-[OPEN] [ARTERIES]++ | نستخدم أشعة الليزر بسبب نفتح الشريان القلب<br>nstxdm A$Eh Allyzr bsbb nftH Al$rAyyn Alqlb<br>We use X-ray because we open the arteries of the heart. |
| c | يعاني القفص الصدري من كسور<br>yEAny AlqfS AlSdry mn kswr<br>The rib cage suffers from fractures. | ++[القفص الصدري] [مشكلة] [كسر]<br>++[AlqfS AlSdry] [m$klp] [ksr]<br>[RIB CAGE] [PROBLEM] [FRACTURE]++ | القفص الصدري مشكلة كسور<br>AlqfS AlSdry m$klh kswr<br>The rib cage problem fractures |

FIG. 21

METHODS, COMPUTER READABLE MEDIA, AND SYSTEMS FOR MACHINE TRANSLATION BETWEEN ARABIC AND ARABIC SIGN LANGUAGE

STATEMENT REGARDING PRIOR DISCLOSURES BY AN INVENTOR

The Ph.D. thesis of Hamzah Luqman of the Information and Computer Science Department of King Fahd University of Petroleum and Minerals, Dhahran 31261, Saudi Arabia, dated Dec. 22, 2017, entitled, "Arabic Sign Language Machine Translation," is incorporated herein by reference in its entirety.

BACKGROUND

Technical Field

The present disclosure is directed generally to machine translation, and, more particularly, to methods, computer readable media, and systems for machine translation between Arabic and Arabic sign language.

Background

Arabic sign language (ArSL) is a full natural language that is used by the deaf in Arabian countries to communicate with their communities. Unfamiliarity with this language increases the isolation of deaf people from society. This language has different structure, word order, and lexicon than Arabic. The translation between ArSL and Arabic is a complete machine translation problem because the two languages have different structures and grammars.

Some implementations of the present disclosure were conceived in light of the above mentioned problems and limitations of conventional machine translation techniques, methods and tools.

SUMMARY

Some implementations can include a method comprising receiving, at a processor, an electronic representation of a first sentence in a first written language, and programmatically performing, using the processor, a morphological analysis of the first sentence to generate a morphological result. The method can also include programmatically performing, using the processor, a syntactical analysis of the morphological result to generate a syntactic analysis result, and generating, using the processor, a first dependency tree corresponding to the first sentence in the first written language based on the syntactic analysis result.

The method can further include receiving, at a second language generation module of the processor, the first dependency tree, one or more transformation rules, a second language dictionary, and a synonym dictionary, and generating, using the second language generation module of the processor, a second dependency tree based on the first dependency tree, one or more transformation rules, the second language dictionary, and the synonym dictionary. The method can also include generating a second sentence in a second written language and a sign language sequence based on the second dependency tree.

In some implementations, the first written language can include Arabic and the second written language can include a gloss notation representation of Arabic Sign Language (ArSL). The sign language sequence can include one or more images representing an Arabic Sign Language (ArSL) sequence. The morphological result can include words of the first sentence along with tagging information associated with one or more of the words of the first sentence.

In some implementations, the syntactic analysis result includes a syntax tree. The second language dictionary includes an Arabic Sign Language (ArSL) dictionary. The synonym dictionary includes a semantic database of Arabic words grouped into one or more sets of synonyms.

In some implementations, generating the second sentence includes applying one or more transfer rules to map the first written language to the second language.

Some implementations can include a non-transitory computer readable medium having instructions stored therein that, when executed by one or more processors, cause the one or more processors to perform a method. The method can include receiving, at the one or more processors, a sentence in a first language, and preprocessing, at the one or more processors, the sentence in the first language. The method can also include programmatically performing a morphological analysis of the sentence in the first language, performing a word level transformation of the sentence in the first language, and programmatically performing a phrase level transformation of the sentence in the first language.

The method can further include programmatically performing a sentence level transformation of the sentence in the first language, and performing post-processing to generate a sentence in a second language.

In some implementations, the word level transformation can include replacing one or more sign words, adjusting gender, adjusting number, transforming based on pronoun agreement, and transforming based on verb and subject agreement. The preprocessing can include transliterating the sentence in the first language.

Some implementations can include a system comprising one or more processors coupled to a non-transitory computer readable medium having stored thereon software instructions that, when executed by the one or more processors, cause the one or more processors to perform operations. The operations can include receiving, at the one or more processors, an electronic representation of a first sentence in a first written language, and programmatically performing, using the one or more processors, a morphological analysis of the first sentence to generate a morphological result. The operations can also include programmatically performing, using the one or more processors, a syntactical analysis of the morphological result to generate a syntactic analysis result, and generating, using the one or more processors, a first dependency tree corresponding to the first sentence in the first written language based on the syntactic analysis result. The operations can further include receiving, at a second language generation module of the one or more processors, the first dependency tree, one or more transformation rules, a second language dictionary, and a synonym dictionary, and generating, using the second language generation module of the one or more processors, a second dependency tree based on the first dependency tree, one or more transformation rules, the second language dictionary, and the synonym dictionary. The operations can also include generating, using the one or more processors, a second sentence in a second written language and a sign language sequence based on the second dependency tree.

In some implementations, the first written language is Arabic and the second written language is a gloss notation representation of Arabic Sign Language (ArSL). The sign language sequence includes one or more images representing an Arabic Sign Language (ArSL) sequence. The morphological result includes words of the first sentence along with tagging information associated with one or more of the words of the first sentence. The syntactic analysis result includes a syntax tree. The second language dictionary includes an Arabic Sign Language (ArSL) dictionary. The synonym dictionary includes a semantic database of Arabic words grouped into one or more sets of synonyms.

In some implementations, generating the second sentence includes applying one or more transfer rules to map the first written language to the second language. The transfer rules can map Arabic to Arabic sign language.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 10 is a diagram showing the process of representing an attached pronoun in ArSL by indexing in accordance with some implementations;

FIG. 12 is a diagram of an example of the use of tense signs to express sentence tense in ArSL in accordance with some implementations;

FIG. 14 is a diagram of various ArSL notation examples in accordance with some implementations;

FIG. 15 is a diagram showing an example of representing wh questions using ASL gloss in accordance with some implementations;

FIG. 17 is a diagram showing different manual translations of an Arabic sentence in accordance with some implementations;

FIG. 18 is a diagram showing use of different part-of-speech (POS) tags for signs in ArSL dictionary in accordance with some implementations;

FIG. 19 is a diagram showing example samples of the resulting translations;

FIG. 21 is a diagram showing samples of sentences manually evaluated in accordance with some implementations.

DETAILED DESCRIPTION

Figure 1:
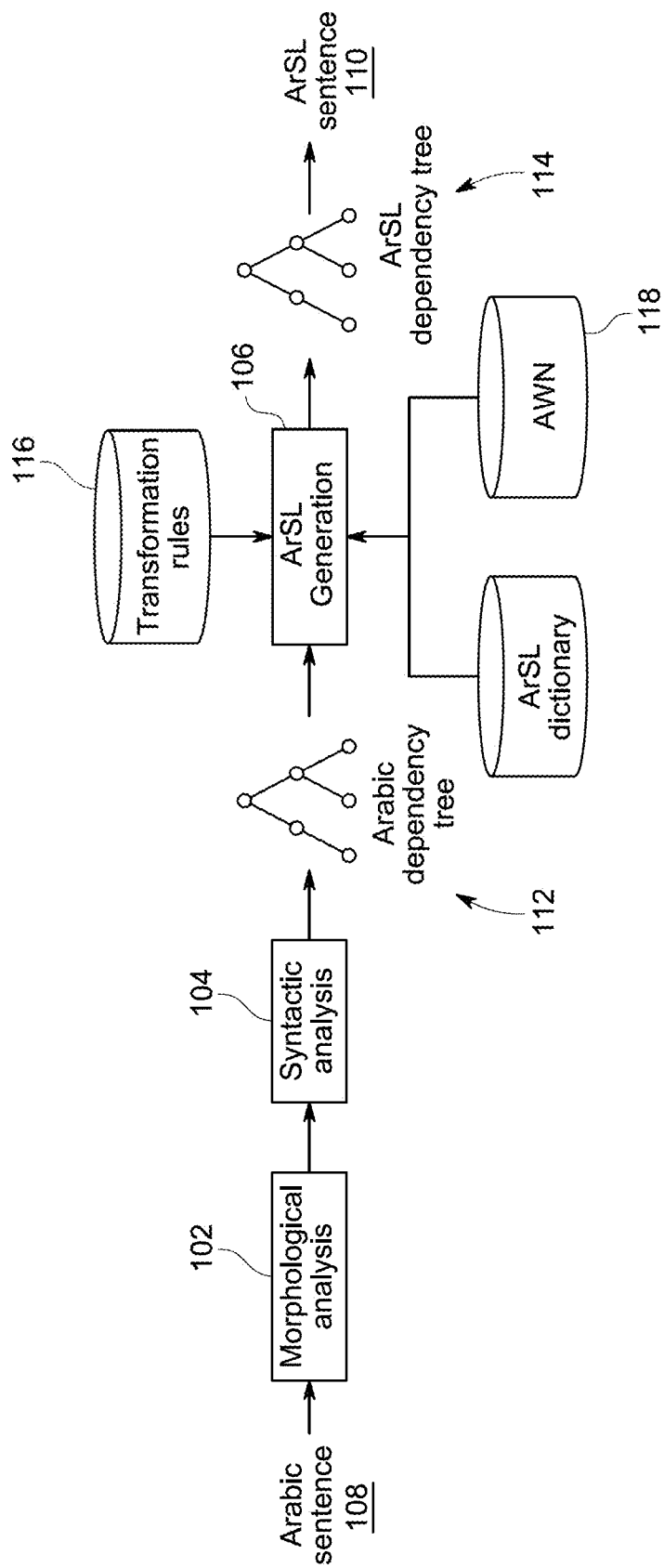
FIG. 1 is a diagram of an example architecture of a translation system in accordance with some implementations.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to methods, systems, and computer readable media for machine translation between Arabic and Arabic sign language. Some implementations can include a rule-based machine translation system to translate between Arabic and ArSL. Some implementations can include a machine translation system to translate the Arabic sentences into ArSL. Some implementations of the disclosed system can perform morphological, syntactic, and semantic analysis on Arabic sentences to translate those sentences into sentences with the grammar and structure of ArSL. In addition, some implementations can include a machine translation system to translate ArSL sentences resulting from ArSL recognition systems into meaningful Arabic sentences. Some implementations of the disclosed system can perform the translation at the word, phrase, and sentence levels.

Some implementations can include a gloss annotation system to transcribe ArSL. Some implementations can represent ArSL signs textually and can help in using ArSL in educational material and signs generation.

In addition, a bilingual corpus consisting of 600 sentences has been developed by the present inventors to evaluate implementations of the disclosed subject matter. The corpus contains sentences from the health domain and each Arabic sentence is translated into ArSL by two ArSL experts. This corpus is divided into training (70%), validation (15%), and testing (15%).

Some implementations of the translation systems were evaluated using the bilingual parallel corpus developed by the present inventors to provide a translation system that provides an accurate translation for more than 80% of the ArSL sentences translated into Arabic and 82% of the Arabic sentences translated into ArSL.

The present disclosure describes a rule-based machine translation system, method and computer system to translate Arabic text into ArSL (herein generally referred to as "the system" and/or "the translation system"). The system translates the input Arabic text into ArSL and represents the resulting ArSL sentence textually using a gloss system and visually using a sequence of sign images. The input Arabic sentence to be translated into ArSL is morphologically, syntactically, and semantically analyzed. This analysis results in sentences that satisfy the structure and grammar of ArSL.

The work was evaluated using the testing part of the bilingual corpus developed in this work and found that the translation system provided good translation for more than 82% of the translated sentences. The translation output was automatically evaluated, and results of 0.35, 0.55, and 0.53 were obtained using the BLEU, WER, and TER metrics, respectively.

Available ArSL recognition systems map the recognized signs to their equivalent Arabic words and preserve the structure and grammar of ArSL which is not fully understandable for Arabic readers as both languages have different structures and grammars. A system for translating ArSL sentences into Arabic by performing the translation at the word, phrase, and sentence levels can provide more accurate translation. This results in sentences that meet the structure and grammar of Arabic.

ArSL is a visual language that uses body language to convey meaning. In some implementations, a translation system can include a textural gloss annotation module to represent ArSL textually. The gloss annotation technique described herein follows certain guidelines for ASL glossing with several changes to suit ArSL (see, e.g., S. K. Liddell, *Grammar, gesture, and meaning In American Sign Language*. Cambridge University Press, 2003, which is incorporated herein by reference). The gloss annotation output can be used to represent the manual and non-manual features of ArSL textually.

ArSL is a full natural language that has structure, word order, and lexicon that differs from those of Arabic. Thus, translation between Arabic and ArSL is challenging. This problem is a complete machine translation problem because ArSL and Arabic are two different languages with different structures and grammars. Conventional machine translation systems for ArSL are at the word level, where a direct mapping is made between the word and its equivalent sign. This type of translation results in a loss of meaning of the sentence because it ignores the structure and grammar of the target language. Thus, a machine translation system between Arabic and ArSL that preserves the structure and grammar of both languages is described herein.

The translation of Arabic text into ArSL is important for the full integration of the deaf into their communities (see, e.g., M. Mohandes, M. Deriche, and J. Liu, *Image-based and sensor-based approaches to Arabic sign language recognition*, IEEE Transactions on Human-Machine Systems, vol. 44, no. 4, pp. 551-557, 2014, which is incorporated herein by reference). Translation systems can be used to translate messages, addresses, and educational materials into ArSL without involving expert translators. The input text can be text generated from speech or text recognition systems. It can also be used with smart phones by translating the incoming messages into ArSL.

Some implementations include a semantic rule-based machine translation system for translating between Arabic and ArSL. The system translates Arabic in the form of text into ArSL by performing lexical, syntactic, and semantic analyses on the Arabic sentence programmatically and applying a set of transformation rules to generate an equivalent in ArSL. In some implementations, the architecture of the system can include a pipeline of three main translation stages: morphological analysis 102, syntactic analysis 104, and ArSL generation 106, as illustrated in FIG. 1.

The input to the system is an Arabic sentence 108 and the output is an ArSL sentence 110 (e.g., represented by the gloss notation and displayed as a sequence of GIF images). The sentence is morphologically analyzed to extract the morphological information of each of its words. The output of this stage is syntactically analyzed using a dependency parser to obtain the relation between the words in the sentence. This stage results in the construction of the parse tree or Arabic dependency tree 112. The generation phase transforms the Arabic parse tree into its equivalent tree in ArSL 114 by applying the transformation rules 116. The transformation rules 116 can be built based on the differences between Arabic and ArSL. This phase also involves lexically translating Arabic phrases and words into their equivalent signs in ArSL. To handle the out-of-vocabulary (OOV) problem that results from the ArSL vocabulary size limitation, the synonym of the OOV word can be used. To ensure that the synonym word preserves the meaning of the sentence, a statistical language model in the synonym selection was applied.

Arabic is a complex language that presents many challenges to NLP (see, e.g., N. Y. Habash, *Introduction to Arabic natural language processing*, Synthesis Lectures on Human Language Technologies, vol. 3, no. 1, pp. 1-187, 2010, which is incorporated herein by reference). Arabic is a highly inflected language, where each Arabic word can be composed of stem, axes, and clitics. For example, the word ويسترجونها, wasayAx*wnhA "and they extract it" consists of two proclitics (و wa and يست yst), one stem (خرجون xrjwn), and one enclitic (ها hA). There are eight inflectional features for each Arabic word: aspect, mood, gender, person, voice, state, case, and number (for more information regarding these features, see N. Y. Habash, *Introduction to Arabic natural language processing*, Synthesis Lectures on Human Language Technologies, vol. 3, no. 1, pp. 1-187, 2010, which is incorporated herein by reference).

Arabic is a derived language, where a new word with a different meaning can be formed from another word (see, e.g., N. Y. Habash, *Introduction to Arabic natural language processing*, Synthesis Lectures on Human Language Technologies, vol. 3, no. 1, pp. 1-187, 2010, which is incorporated herein by reference). For example, the word كاتب kAtb "writer" can be derived from the word كتب ktb "write." The variety of Arabic dialects adds another challenge to NLP. Modern standard Arabic (MSA) has been used conventionally, which is the language of journals, education, and news, in nearly all Arabic countries.

In some implementations, the MADAMIRA toolkit can be used to analyze the sentence and extract all words' features (see, e.g., A. Pasha, M. Al-Badrashiny, M. T. Diab, A. El Kholy, R. Eskander, N. Habash, M. Pooleery, O. Rambow, and R. Roth, *MADAMIRA: A fast, comprehensive tool for morphological analysis and disambiguation of Arabic*, in LREC, vol. 14, 2014, pp. 1094-1101, which is incorporated herein by reference). MADAMIRA is a morphological analyzer used for the morphological analysis and disambiguation of Arabic text. MADAMIRA can perform a set of NLP tasks, such as spelling correction, lemmatization, stemming, diacritization, morphological disambiguation, glossing, POS tagging, and tokenization. MADAMIRA was run on the transliterated Arabic sentences and obtain a list of analyses for each word, which species all possible morphological interpretation of that word in addition to its morphological features. The words of a sentence with its POS tag are used as the input for the syntactic analysis stage, and other morphological features are used in the generation stage to generate an ArSL sentence.

Figure 2:
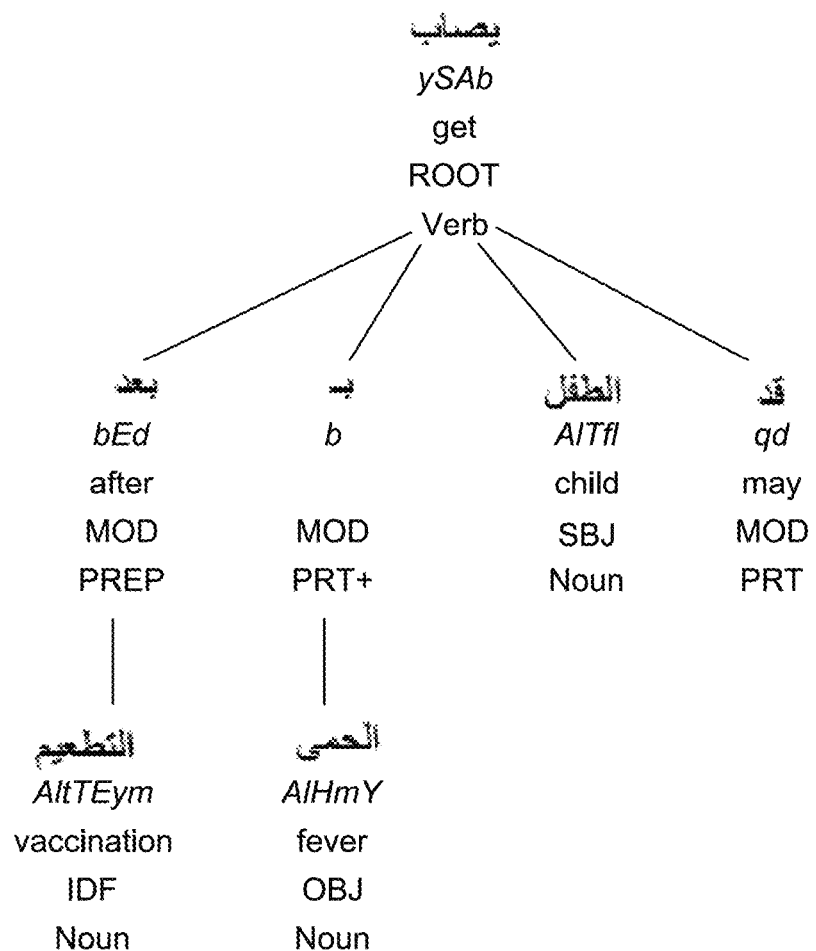
FIG. 2 is a diagram of an example dependency tree in accordance with some implementations.

The words of the tokenized sentence with their POS tag, which are produced by MADAMIRA, are used in the syntactic analysis stage to extract the sentence structure. The sentence structure is represented as a parse (or syntax) tree using CamelParser (see, e.g., A. Shahrour, S. Khalifa, D. Taji, and N. Habash, Camelparser: *A system for Arabic syntactic analysis and morphological disambiguation*, in Proceedings of COLING 2016, the 26th International Conference on Computational Linguistics: System Demonstrations, 2016, pp. 228-232, which is incorporated herein by reference). CamelParser is an Arabic syntactic dependency parser that uses MaltParser to produce morphologically enriched syntactic dependencies (see, e.g., A. Shahrour, S. Khalifa, D. Taji, and N. Habash, *Camelparser: A system for Arabic syntactic analysis and morphological disambiguation*, in Proceedings of COLING 2016, the 26th International Conference on Computational Linguistics: System Demonstrations, 2016, pp. 228-232, and J. Nivre, J. Hall, J. Nilsson, A. Chanev, G. Eryigit, S. Kubler, S. Marinov, and E. Marsi, *Maltparser: A language-independent system for data-driven dependency parsing*, Natural Language Engineering, vol. 13, no. 02, pp. 95{135, 2007, both of which are incorporated herein by reference). FIG. 2 shows the dependency tree of the Arabic sentence قد يصاب الطفل بالحمى بعد التطعيم qd ySAb Alt bAlHmY bEd AltTEym "Child may get fever after vaccination" parsed by Camel-Parser. The tree shows the relations and POS tags produced by CamelParser in the CATiB annotation. (See, e.g., N. Habash, R. Faraj, and R. Roth, *Syntactic annotation in the Columbia Arabic treebank*, in Proceedings of MEDAR International Conference on Arabic Language Resources and Tools, Cairo, Egypt, 2009, which is incorporated herein by reference).

The morphological features with the parse tree of the Arabic sentence are used to generate the ArSL sentence. In this stage, first, the lexical transformations are applied to the sentence phrases and words, and then, the transformation rules are applied to generate the equivalent ArSL sentence.

The phrases and words of the sentence are lexically transformed into its ArSL equivalents using the ArSL dictionary. The phrases of the sentence are extracted in the syntactic analysis stage. First, these phrases are lexically translated into ArSL because certain Arabic phrases have a single equivalent ArSL sign. For example, the Arabic phrase التأمينات الاجتماعية والضمان الاجتماعي Alt>mynAt AlAjtmAEyp wAlDmAn AlAjtmAEy "social insurance and social guaranty" has an equivalent sign in the ArSL dictionary that removes the need to translate its words separately.

The lexical transformer moves to the lower level of the phrase (words and tokens) when the phrase does not have an equivalent sign in the dictionary. ArSL typically uses the same sign for all word inflections. For example, the words مسافر msAfr "passenger", سفر sfr "travel (noun)", and يسافر ysAfr "travel (verb)" have only one equivalent sign in the ArSL dictionary, which is for the word [سفر] [sfr] "[TRAVEL] (noun)." To address this problem, the lemma of the Arabic words was used because all words' inflections share the same lemma. Names and numbers are not translated because they are finger-spelled. The ArSL dictionary is limited to approximately 3,200 signs, which causes the OOV problem. In some implementations, this problem can be addressed by using the synonym of the OOV words with Arabic WordNet (AWN) 118. (See, e.g., S. Elkateb, W. Black, H. Rodriguez, M. Alkhalifa, P. Vossen, A. Pease, and C. Fellbaum, *Building a wordnet for Arabic*, in Proceedings of The fifth international conference on Language Resources and Evaluation (LREC 2006), 2006, which is incorporated herein by reference). AWN is a semantic database of Arabic words that are grouped into sets of synonyms. AWN also provides definitions of the word with its category, such as noun, verb, or adverb. It returns a set of synonyms for each word, which may not be related to the sentence context. To address this issue and select from the AWN synonyms, first, the system uses the word that is diacritisized by the MAD-AMIRA toolkit with its POS tag to retrieve the synonyms from AWN. This step helps to limit the synonym words. Then, the system uses a statistical language model to select the synonym that preserves the meaning of the sentence. A 3-gram language model was built with the KenLM toolkit using an Arabic corpus, which consists of 5,637,151 words. (See, e.g., K. Heaeld, *KenLM: Faster and smaller language model queries*, in Proceedings of the Sixth Workshop on Statistical Machine Translation, Association for Computational Linguistics, 2011, pp. 187-197, and M. Al-Jefri, *Real-word error detection and correction in Arabic text*, Master's thesis, King Fahd University of Petroleum and Minerals, 2013, both of which are incorporated herein by reference). KenLM (with Kneser-Ney smoothing and default backoff) is used because it uses less memory and is faster than SRILM and IRSTLM (see, e.g., K. Heaeld, *KenLM: Faster and smaller language model queries*, in Proceedings of the Sixth Workshop on Statistical Machine Translation. Association for Computational Linguistics, 2011, pp. 187-197, and A. Stolcke, *SRILM—an extensible language modeling toolkit*, in Proceedings International Conference on Spoken Language Processing, 2002, pp. 257-286, M. Federico, N. Bertoldi, and M. Cettolo, *IRSTLM: an open source toolkit for handling large scale language models*, in Interspeech, 2008, pp. 1618-1621, each of which is incorporated herein by reference). The synonym words are scored using KenLM, and the closest synonym to the source word in meaning is selected.

After the lexical transformation, the rule transformation is applied. The morphological features of the words in the sentence with the parse tree, which was generated in the morphological and syntactic stages, are transformed into its equivalent tree in ArSL by applying the rules based on the mapping of Arabic to ArSL. The transfer rules (Table 1) cover the mappings at three levels: word, phrase, and sentence.

The rules that are related to the word's inflectional features, such as gender and number, are applied at the word level. For example, the word طالبتان TAlbtAn "two girl students" is translated into [بنت] [طالب] [اثنان] [bnt] [TAlb] [AvnAn] "[GIRL][STUDENT] [TWO]" by applying "R1" in Table 1. The word [بنت] [bnt] "[GIRL]" is added before the word [طالب] [TAlb] "student" because it is a feminine noun, whereas the word [اثنان] Avnan] "[TWO]" is added at the end because the original noun is dual.

Then, the transfer rules are applied to the sentence clauses ("R2-R3" in Table 1). For example, the negation rule involves moving the negation character to the end of the clause; for instance, the clause غير سعيد gyr sEyd "unhappy" is translated into [سعيد] [لا] [sEyd][lA] "[HAPPY] [NO]," where the negation character غير gyr is moved to the end of the clause and replaced by its ArSL equivalent sign [لا] [lA] "[NO]."

Figure 3:
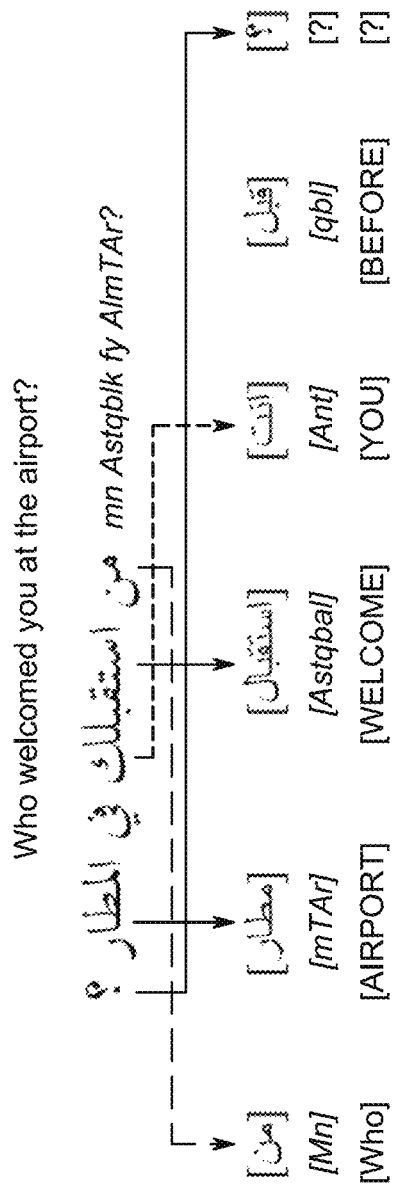
FIG. 3 is a diagram of an example Arabic sentence translated into ArSL in accordance with some implementations.

Finally, the transfer rules are applied to the entire Arabic sentence ("R4-R11" in Table 1). The sentence structure will be changed to match the structure of the ArSL sentence. Additionally, new words may be added to the sentence, such as time words, whereas other words may be discarded, such as prepositions. FIG. 3 shows an example of an Arabic question sentence transformed into ArSL. As shown in FIG.

3, the Arabic question sentence has the VO structure. This structure is transformed into the OV ArSL structure. The word [قبل] [qbl] "[BEFORE]" is added to the sentence because the main verb in the sentence is in the past tense. In addition, the question sign is moved to the front of the sentence, whereas the question word is moved to the end.

sentence levels. The input to the translation system is a set of Arabic words resulting from the ArSL recognition system.

These words represent the ArSL sentence which is annotated using the gloss annotation system described herein. Translating this sentence into Arabic starts by pre-processing the input ArSL sentence and then translating it into

TABLE 1

The main transfer rules from Arabic to ArSL

R1  IF input is an Arabic word with its morphological features (Gender: gen, Number: num, Rationality: rat) THEN transfer it into:
            <PluralSign01> + <GENDER> + [SIGN] + <PluralSign02>
  IF (num = dual and rat = Non-human)  THEN < PluralSign01>  "[اثنان]"  //[AvnAn][TWO]
  IF (gen = Feminine)       THEN <GENDER>   "[بنت]"   //[bnt][GIRL]
  IF (num = dual and rat = human)   THEN <PluralSign02>  "[اثنان]"  //[AvnAn][TWO]
  ELSE IF (num = plural and rat = human) THEN <PluralSign02>  "[ثلاثة]"  //[vlAvp][THREE]
  ELSE IF (num = plural and rat = Non-human) THEN <PluralSign02> "[الوم]"  //[kvyr][MUCH]
  [SIGN] = The equivalent ArSL sign of Arabic word
R2 IF Arabic phase starts with negation THEN [ArSL phase] + ( "[لايوجد]"      //[lAywjd][NOT EXIST]
                   OR "[ابدا]"       //[AdbA][NEVER]
                   OR "[لا]" )       //[lA][NO])
R3 IF Arabic phase starts with time modifers THEN [ArSL phase] + ("[قبل]"     //qbl/[BEFORE]
                   OR "[بعد]"       //[bEd][AFTER]
                   OR "[اثناء]" )      //[AvnA'][DURING])
R4 IF input is an Arabic sentence and its cateory is question THEN transfer it into [?] + [ArSL sentence] + [Question sign]
R5 IF input is an Arabic sentence with structure SOV THEN Reorder words to SVO
R6 IF input is an Arabic sentence with structure VOS THEN Reorder words to SVO
R7 IF input is an Arabic sentence with structure VS THEN Reorder words to SV
R8 IF input is an Arabic sentence with structure VSO THEN Reorder words to SVO
R9 IF input is an Arabic sentence with structure OV THEN Reorder words to VO
R10 IF input is a verbal Arabic sentence in tense ts THEN transfer it into [TenseSign] + [ArSL sentence]
  IF (ts = past)    THEN [TenseSign] ="[قبل]"  //[qbl][BEFORE]"
  ELSE IF (ts = present) THEN [TenseSign] ="[الان]"  //[AlAn][NOW]
  ELSE IF (ts = future) THEN [TenseSign] ="[قريبا]"  //[qrybA][SOON]
R11 IF input is a command Arabic sentence in tense ts THEN transfer it into [pronoun]
                   + "[لازم]"      //[lAzm]][MUST]
                   + [ArSL sentense]
R12 IF Arabic word is in [Relative, conditional, particles, demonstrative) ad not in ArSL dictionary THEN remove it from the sentence
R13 IF Arabic word is proper noun or number THEN fingerspell it
R14 IF Arabic word or its synonym is unavailable in the ArSL dictionary THEN fingerspell it
R15 IF the Arabic word includes possessive/attached pronouns THEN split it and add detached pronoun after the sign The final representation of ArSL can be in the form of ArSL gloss annotation and a sequence of GIF images. (See, *Arabic sign language dictionary*, http://www.menasy.com/. Last visit: April, 2017, 2017, which is incorporated herein by reference).

Figure 4:
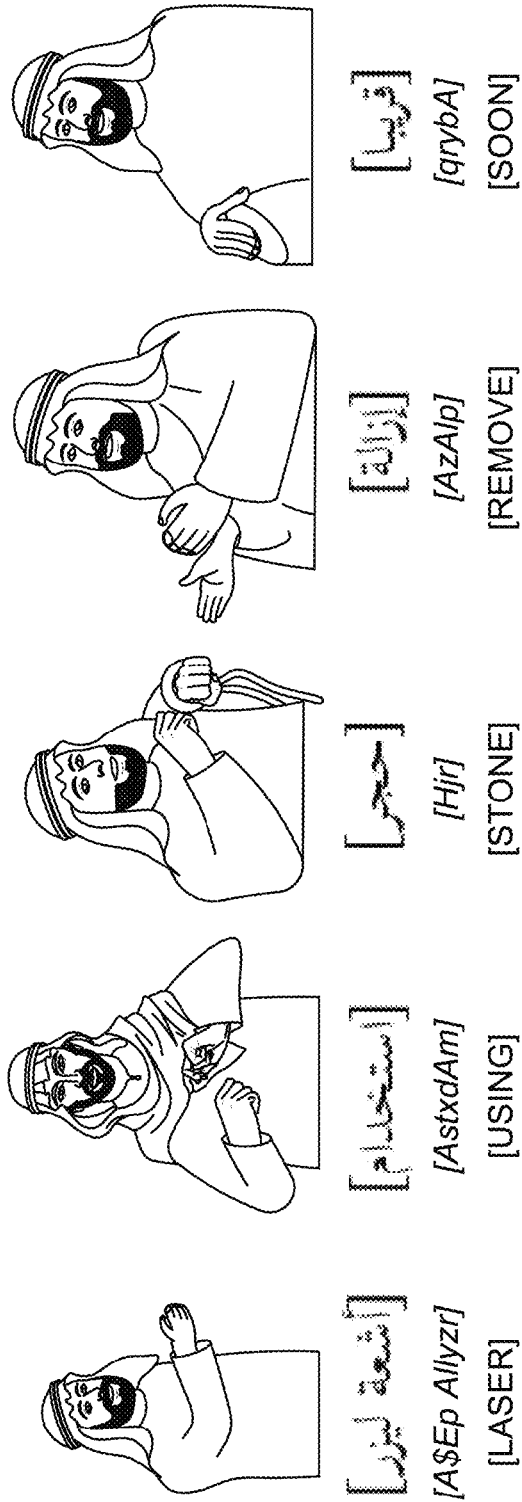
FIG. 4 is a diagram of an example Arabic sentence translated into ArSL and represented by imagery in accordance with some implementations.

FIG. 4 shows an example of an Arabic sentence translated into ArSL. ArSL recognition systems recognize continuous ArSL sentences and represent the output verbally or textually as a set of Arabic words. Conventional ArSL recognition systems perform direct mapping between the recognized signs in ArSL sentence and their equivalent Arabic words. This preserves the structure and grammar of ArSL sentence and ignores the structure and grammar of the target language, Arabic, which results in Arabic sentences with vague meaning. In order to convert these sentences into Arabic sentences with correct structure and grammar, a layer between the ArSL recognition system and the end-user was added. This layer is responsible for translating the sentence resulting from ArSL recognition system into Arabic as shown in FIG. 5.

Figure 5:
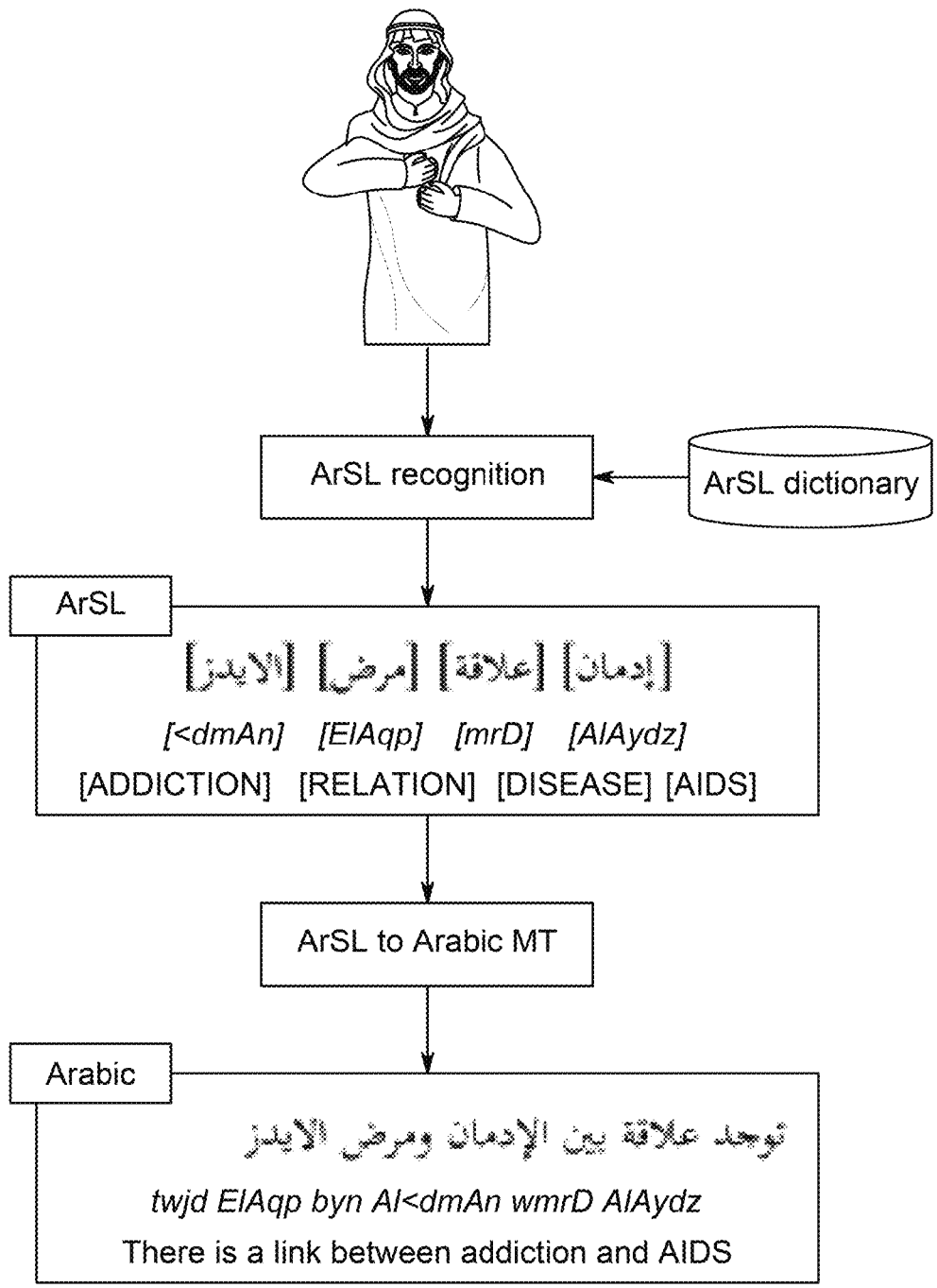
FIG. 5 is a diagram of an ArSL recognition and translation framework in accordance with some implementations.

Further, as shown in FIG. 5, the output of ArSL recognition system is a set of isolated Arabic words representing the signs in ArSL sentence. ArSL to Arabic machine translation system translates these words into meaningful Arabic sentence. Some implementations can include a machine translation system that works at the word, phrase, and sentence levels. Finally, post-processing is performed to the output to enhance the translation.

Figure 6:
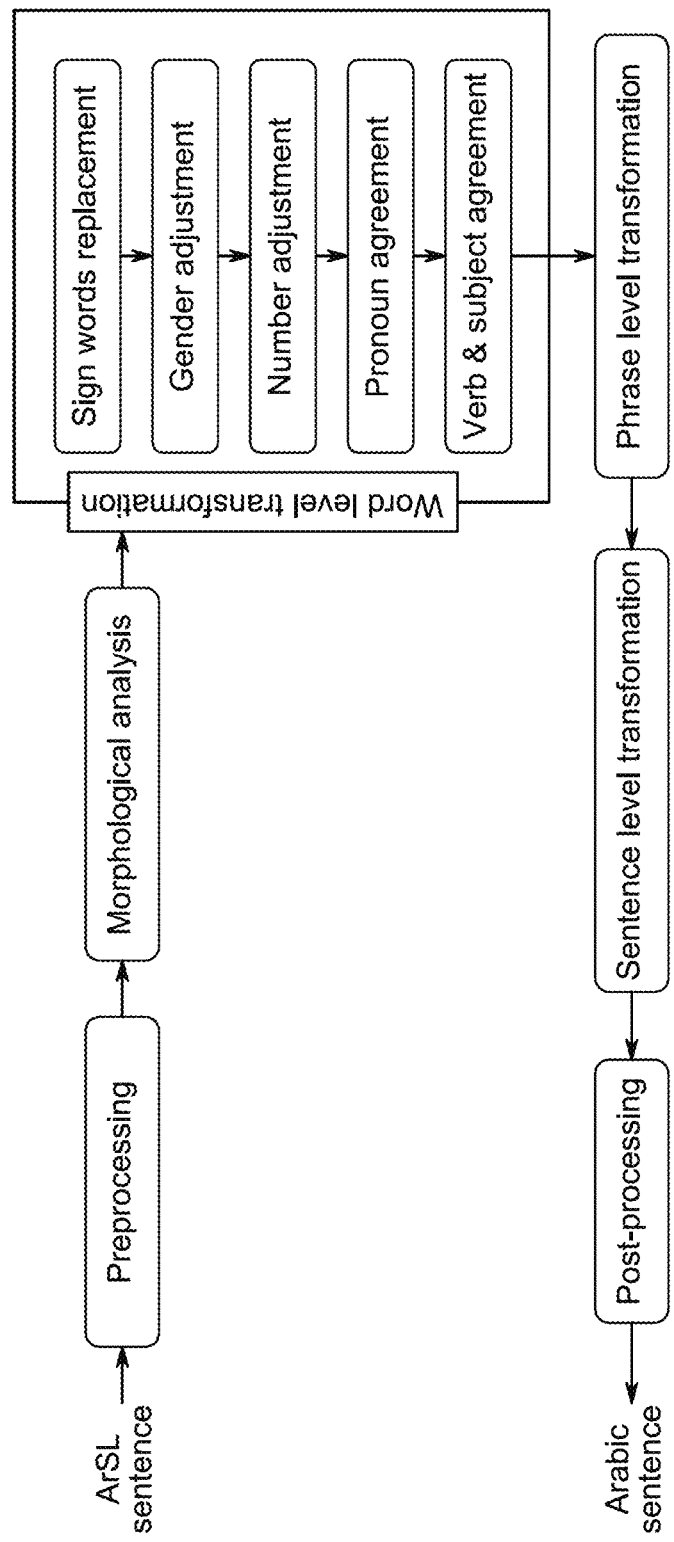
FIG. 6 is a diagram of an example ArSL to Arabic machine translation system framework in accordance with some implementations.

FIG. 6 shows the framework of an implementation of the disclosed system. The output of the ArSL recognition system is an ArSL sentence represented as a sequence of Arabic words. These words are encoded in UTF-8 and are the input to the machine translation system. The first step in the pre-processing stage is transliterating the input text using Habash-Soudi-Buckwalter (HSB) transliteration system (see, e.g., N. Habash, A. Soudi, and T. Buckwalter, *On Arabic transliteration*, in Arabic computational morphology. Springer, 2007, pp. 15-22, which is incorporated herein by reference). This transliteration helps in using the NLP tools that do not support UTF-8 encoding. To remove the variations between the words with the same meaning, the input sentence can be normalized as follows:—

All Alif variations (viz أ "Alif with Hamza over", إ "Alif with Hamza under", آ "Alif with maddah", and ٱ "Alif with wasla") are normalized into ا "Alif without Hamza."

ة "Taa marbutah" is normalized into ه "Haa."

Figure 7:
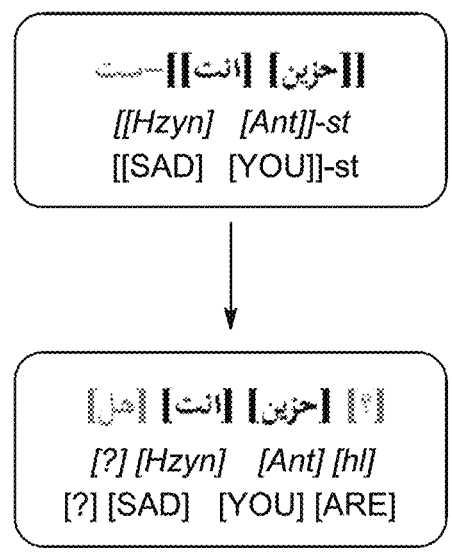
FIG. 7 is a diagram of converting facial expressions into words in accordance with some implementations.

Then system interprets the gloss notations and converts them into their equivalent words. The facial expressions that are expressed using characters attached to the sign(s) are converted to words representing the facial expression and are inserted in their appropriate positions preserving the structure of the ArSL sentence. For example, the facial expression ست st that represents interrogation is shown in FIG. 7 attached to the signs. Convert this facial expression into question mark and هل hl "ARE" and insert these new words, according to the structure of ArSL sentence, at the beginning and end of the sentence, respectively.

Translating an ArSL sentence into Arabic requires some information about each sign word in the ArSL sentence. The required information can be extracted by performing morphological analysis on the ArSL sentences' sign words. However, the available morphological analyzers are trained on languages other than ArSL that make them unable to analyze the ArSL sentences. In addition, training morphological analyzers on ArSL requires large annotated ArSL corpus for this purpose which is unavailable. To address this challenge, gender, number, POS, and English translation are extracted from the input sentence as follows:

Feminine noun in ArSL is expressed by performing [بنت] [bnt] "[GIRL]" sign before the noun.

This sign to set the gender feature of the following noun sign to feminine and then the [بنت] [bnt] "[GIRL]" sign is removed from the sentence. MADAMIRA toolkit was used to obtain the gender of other sign words (see, e.g., A. Pasha, M. Al-Badrashiny, M. T. Diab, A. El Kholy, R. Eskander, N. Habash, M. Pooleery, O. Rambow, and R. Roth, *MADAMIRA: A fast, comprehensive tool for morphological analysis and disambiguation of Arabic*. in LREC, vol. 14, 2014, pp. 1094-1101, which is incorporated herein by reference).

Plurality in ArSL is expressed by repeating the sign or using dedicated signs such as [ثلاثة] [vlAvh] "[THREE]" or [كثير] [Kvyr] "[MUCH]." These signs and sign repetition are used to set the number feature of the sign word to single, dual, or plural.

Proper nouns are finger spelled in ArSL and expressed in ArSL gloss annotation system between hashes (#). This helps in identifying proper nouns and setting their POS feature to proper noun. Some verbs and nouns share the same sign in ArSL. However, the way of signing the verb can be distinguished by the ArSL recognition systems. This information is encoded in the ArSL gloss notation system and used to set the POS tag of that signs to verb.

English translation of each sign is obtained using MADAMIRA toolkit (see, e.g., A. Pasha, M. Al-Badrashiny, M. T. Diab, A. El Kholy, R. Eskander, N. Habash, M. Pooleery, O. Rambow, and R. Roth, *MADAMIRA: A fast, comprehensive tool for morphological analysis and disambiguation of Arabic*. in LREC, vol. 14, 2014, pp. 1094-1101, which is incorporated herein by reference).

Figure 8:
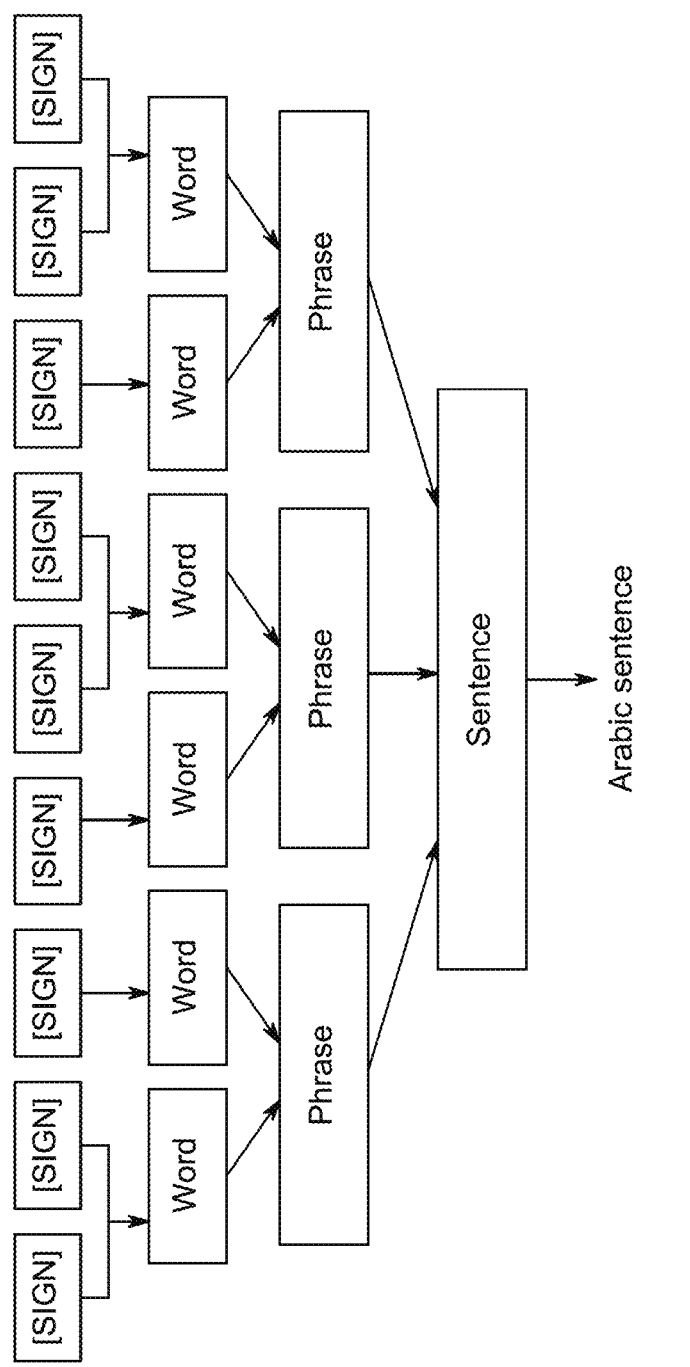
FIG. 8 is a diagram of an example process to translate ArSL sign words into words, phrases, and Arabic sentence in accordance with some implementations.

ArSL differs from Arabic at the structure and grammar of word, phrase, and sentence. Translating ArSL sentence into Arabic passes through three translation levels: word, phrase, and sentence (FIG. 8). The translation system starts by translating ArSL sign words into their corresponding Arabic words. Then these words are formed into phrases which are combined to form Arabic sentences according to the structure and grammar of Arabic. Each translation level involves substages that will be discussed in the following sections.

Word Level Translation

ArSL recognition systems replace each sign with its equivalent Arabic word in the ArSL dictionary. ArSL uses dedicated signs to show the gender, number, and tense of the word in contrast to Arabic which inflects the word to show the gender, number, and tense. For example, the Arabic word مدرسات mdrsAt "feminine teachers" are expressed in ArSL as [بنت] [مدرس] [ثلاثة] [bnt] [mdrs] [vlAvp] "[GIRL] [TEACHER] [THREE]." The first sign [بنت] [bnt] "[GIRL]" is used to show the gender of the next sign, [مدرس] [mdrs] "[TEACHER]", while the last sign, [ثلاثة] [vlAvh] "[THREE]", is used to show the number which is more than two in this example. Word level translation involves a set of sub-stages to convert these signs into Arabic words and make the resulting words agree with the subject and verb of the sentence in gender and number. These sub-stages involve sign replacement, gender agreement, number agreement, pronoun agreement, and verb and subject agreement.

(a) Sign Words Replacement

ArSL has a limited vocabulary size (approximately 3,200 signs) that makes deaf people depend mainly on using word synonyms or describing the OOV words using other words.

For example, some deaf uses [السبب] [Alsbb] "[REASON]" sign instead of لماذا ImA*A "why" word in question sentence. Replace such words with their equivalent Arabic words. Table 2 shows the signs replaced by their equivalent Arabic words.

TABLE 2

| ArSL signs replaced with their equivalent Arabic words | |
|---|---|
| Sign | Arabic equivalent |
| هنا أم هنا hnA Am hnA "HERE OR HERE" | أين Ayn "where" |
| السبب Alsbb "REASON" | لماذا ImA*A "why" |
| لا lA "NO" | غير، لا، إ، لن، ليس، ليست gyr, lA, lm, ln, lys, lyst "NO" |
| لازم lAzm "MUST" | يجب yjb "MUST" |

(b) Gender Adjustment

ArSL uses the same sign for masculine and feminine. It uses [بنت] [bnt] "[GIRL]" sign before the noun for feminine nouns whereas Arabic inflects nouns to show the gender.

For example, [بنت] [جندي] [bnt] [jndy] "[GIRL] [SOLDIER]" correspond to the Arabic word جندية jndyp "feminine soldier."

In this stage, convert the ArSL feminine nouns into their corresponding Arabic by adding ه h "Haa", اء A' "Alif with hamza", and ى Y "Taa maqsurah" to the masculine form of the noun and remove the [بنت] [bnt] "[GIRL]" sign from the ArSL sentence.

Figure 9:
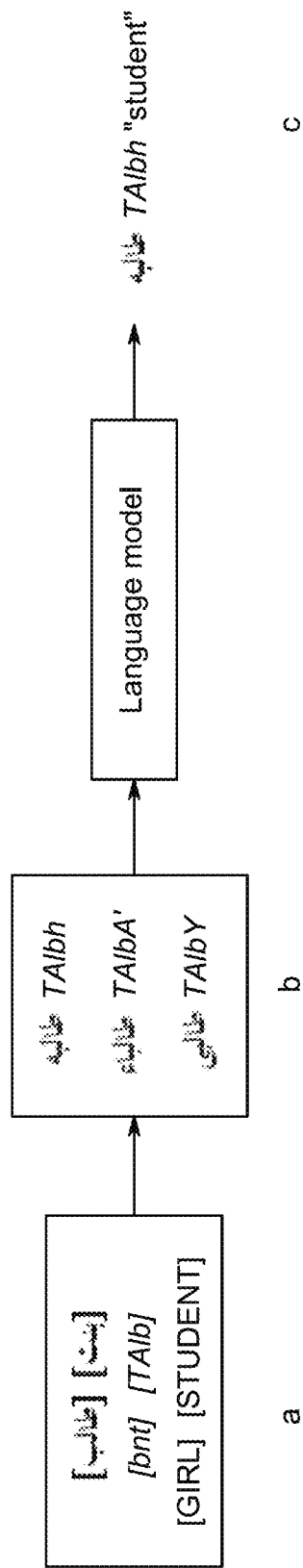
FIG. 9 is a diagram of an example process to convert an ArSL feminine noun into Arabic in accordance with some implementations.

This results in three candidate feminine nouns of each ArSL feminine noun as shown in FIG. 9. To select among the candidate feminine nouns apply statistical language model using the KenLM toolkit. (See, e.g., K. Heaeld, *KenLM: Faster and smaller language model queries*, in Proceedings of the Sixth Workshop on Statistical Machine Translation. Association for Computational Linguistics, 2011, pp. 187-197, which is incorporated herein by reference).

(c) Number Adjustment

Plurality is expressed in ArSL by repeating the sign or using other signs such as [ثلاثة] [vlAvp] "[THREE]" or [كثير] [kvyr] "[MUCH]" with the singular form of the sign. In contrast, Arabic inflects the noun to show the number. For example, the Arabic plural noun رجال rjAl "men" is expressed in ArSL as [ثلاثة رجل] [vlAvp] [rjl] "[THREE] [MAN]." To convert the ArSL plural signs into Arabic, consider the following:

Target plural type: There are different types of plural in Arabic (dual, masculine plural sound, feminine plural sound, and broken plural). Select the target plural to convert the ArSL sign into based on the following rules:—

Convert the sign into Arabic dual plural if the ArSL sign is repeated or preceded/followed by [اثنان] [AvnAn] "[TWO]" sign.

Convert the sign into Arabic plural (sound or broken) if the ArSL sign is repeated more than once or followed by [ثلاثة] [vlAvp] "[THREE]" or [كثير] a [kvyr] "[MUCH]" signs.

Arabic nouns and adjectives can have more than one plural based on its position in the sentence.

There may be no previous Arabic NLP tools to find the plural form of the singular Arabic word. Accordingly, the present inventors developed a rule-based technique to get the plural forms of the Arabic singular word. In addition, the present inventors collected a corpus for ArSL broken plurals consisting of 30,296 singular words with their plurals.

i. Dual Plural Conversion

Dual plural is used to refer to two people or two things. ArSL repeats sign or uses [اثنان] [AvnAn] "[TWO]" sign word to express the dual plural. ArSL recognition systems output the dual sign words in the same form that are expressed in ArSL (repeating singular word or using [اثنان] [AvnAn] "[TWO]" word before or after the singular word). In contrast, Arabic inflects the singular to shows the dual plural.

Arabic dual plural has two main forms in Arabic: Word+ ان An and Word+ين yn.

The first form is used with nominative nouns and adjectives while the second form is used with genitive and accusative nouns and adjectives.

Conventional tools to convert Arabic singular word into dual are not effective or unavailable. Thus, the following Algorithm 1 converts the singular Arabic word into dual.

As shown in the algorithm, the dual of the input word is obtained by applying the following rules:—

If the singular word ends with ى "Alif maqsurah" and If the word consists of three characters and ى Y "Alif maqsurah" was originally و w "Waw", then replace ى Y "Alif maqsurah" by و w "Waw" and append ين yn to the word. Otherwise, replace ى Y "Alif maqsurah" by ي y

---

Algorithm 1 Singular to dual plural converter algorithm

Require: w: Arabic singular word to be converted into dual plural
Ensure: dualPlurals: dual plural(s) of the input word w
1:     LastChars = w.getLastCharacters( )
2:     switch LastChars do
3:         case ى Y "Alif maqsurah"
4:             if w.getLength( )==3 then
5:                 if LastChars was originally و w "Waw" then

---

Algorithm 1 Singular to dual plural converter algorithm

6:                     w = w.replaceCharacter(lastChars, و w "Waw")
7:                     dual = w + ين Yn
8:                 else
9:                     w = w.replaceCharacter(lastChars, ي Y "Yaa")
10:                    dual = w + ان An
11:                end if
12:            else
13:                w = w.replaceCharacter(lastChars, ي Y "Yaa")
14:                dual = w + ان An
15:            end if
16:            dualPlurals.add(dual)
17:        case ة p "Taa marbutahh" or ه h "Haa"
18:            w = w.replaceCharacter(lastChars, ت "Taa")
19:            dualPlurals.add(w + ان An)
20:        case و w "Waw"
21:            dualPlurals.add(w + ين Yn)
22:        case اء A ' "Alif with Hamza"
23:            if ء "Hamza" is not original then
24:                w = w.replaceCharacter(' "Hamza", و w "Waw")
25:            end if
26:            dualPlurals.add(w + ان An)
27:        other
28:            dualPlurals.add(w + ان An)
29:            dualPlurals.add( w + ين Yn)

and append ان An to the word. For example, $$[فتى] + [ftY] + \text{"[BOY]"} + \xrightarrow{dual\ plural} فتيان$$

ftyAn "two boys"

if the singular word ends with ة p "Taa marbutah" or ه h "Haa", then replace them by ت t "Taa" and add ان An to the word. For example, $$[خيمة] + [xymp] + \text{"[TENT]"} + \xrightarrow{dual\ plural} خيمتان$$

xymtAn "two tents"

If the singular word ends with و w "Waw", then add ين yn to the word. For example $$[دلو] + [dlw] + \text{"[PAIL]"} + \xrightarrow{dual\ plural} دلوين$$

dlwyn "two pails"

If the word ends with اء A' "Alif with Hamza", then if ء ' "Hamza" is original, add ان An otherwise replace ء ' "Hamza" by و w "Waw" and add ان An to the word. For example, $$[صحراء] + [SHrA'] + \text{"[DESERT]"} + \xrightarrow{dual\ plural} صحراوان$$

SHrAwAn "two deserts"

If none of the above rules is satisfied, then return two dual plurals for the word by attaching ان An and ين yn to the word and select between them later using the language model.

ii. Plurals Conversion

ArSL repeats the sign two times or uses dedicated signs such as [ثلاثة] [vlAvp]"[THREE]" and [كثير] [kvyr]

"[MUCH]" to show the plurality of the sign. The equivalent of this plural in Arabic is either broken plural or sound plural.

Broken plural conversion: Arabic broken plural differ from other plurals in that it depends on the word pattern and follows different rules in forming plurals. It changes the form of singular word to another form. For example, the broken plural of the singular noun دواء dwA' "medicine" is أدوية Adwyp "medicines" where new letters are added (ة ،ي، p) and others are removed (ء '). Broken plural uses the pattern of the singular to convert it into one or more of its twenty-one patterns according to the availability of diacritics on the singular pattern. The twenty-one patterns of broken plural are فعل fEl, فعلاء fElA', فعلان fElAn, فعله fElh, مفاعل mfAEl, فواعل fwAEl, فعول fEwl, فعلى fElY, فعائل fEA}l, افعله AfElh, افاعل AfAEl, افاعيل AfAEyl, افعال AfEAl, افعلاء AfElA', فعال fEAl, فعال fEAll, فعالي fEAlY, فعالي fEAly, افعل AfEl, فعال fEAl, and فعل fuEul.

To get the broken plural of the singular noun, first search for the singular word in the broken plurals corpus. If it is unavailable in the corpus, then generate its broken plural.

No corpus that includes all Arabic broken plurals in conventionally available. Available lists were gathered by researchers and each list contains some broken plurals. Attia et al. presented a list consisting of 2,561 broken plural forms (see, e.g., M. Attia, P. Pecina, L. Tounsi, A. Toral, and J. Van Genabith, *Lexical profiling for Arabic*, Proceedings of eLex, pp. 23-33, 2011, which is incorporated herein by reference). This list is automatically extracted from a large contemporary corpus, provided with morphological patterns for both the singular and plural forms. Another list is provided by Elghamry which contains about 13,000 broken plural forms. This list was automatically extracted from the electronic version of Almotkan Arabic-Arabic Dictionary (see, e.g., K. Elghamry, *A lexical-syntactic solution to the problem of broken plural in Arabic*, in Arabic Natural Language Processing Track, (G. U. R. T. G. 2010), Ed., Washington, USA, March 2010, which is incorporated herein by reference). The third list is presented by Amil dictionary (see, e.g., E. B. Yaqoub, *The detailed dictionary in the plurals*. (*In Arabic*). Scientific Book House, 2004, which is incorporated herein by reference). This list is manually evaluated and it contains 14,268 broken plural forms. Combine these lists and removed duplicated plurals. In addition, split the different broken plural forms of the same singular noun into separated lines in the corpus to create a corpus of 30,296 Arabic singular words with their broken plurals.

To generate the broken plural, first extract the pattern of the singular word using Alkhalil morphological analyzer (see, e.g., A. Chennouand A. Mazroui, *Morphological, syntactic and diacritics rules for automatic diacritization of Arabic sentences*, Journal of King Saud University-Computer and Information Sciences, vol. 29, no. 2, pp. 156-163, 2017, which is incorporated herein by reference). Then apply the broken plural patterns to the singular pattern to get a set of plurals. The Almaany dictionary was used to validate and filter the generated broken plurals (see, e.g., *Almaany dictionary*, URL: http://www.almaany.com. Last visit: August, 2017, 2017, which is incorporated herein by reference). Plurals that are not in the dictionary are ignored as they are not Arabic words while other plurals are returned.

Sound plural conversion: The Arabic sound plural is a suffix which is added to the end of the Arabic word to indicate the plural. The suffix reflects the gender and the case. There are two types of Arabic sound plurals masculine and feminine. The first stage in generating these plurals is checking if the target plural of the ArSL plural is broken plural as discussed in the previous section. For non-broken plurals, the sign is converted into feminine sound plural if the ArSL sign word is feminine or ends with ه h "Haa" or ة p "Taa marbutah" otherwise it will be converted into masculine sound plural. ArSL sign is converted into Arabic feminine sound plural by adding ات at to the singular word. However, there are some exceptions as following:

- If the word ends with ة p "Taa marbutah", then remove it and add ات at to the end of the word (FIG. 10(a)).
- If the word ends with ى Y "Alif maqsurah", then:—
  - If word length is greater than three characters then ى Y "Alif maqsurah" is replaced with ي y and ات at is added (FIG. 10(b)).
  - If the word consists of three characters and ى Y "Alif maqsurah" was originally و w "Waw" or ي y "Yaa", then return it to its original letter and add ات at to the word, otherwise ى Y "Alif maqsurah" is replaced by و w "Waw" and ات at is added (FIG. 10(c-d)).
- If the word ends with اء A' "Alif and hamza" and ء "Hamza" is original, then ات at is added (FIG. 10(e)) else ء ' "Hamza" is replaced with و w "Waw" and ات at is added to the word (FIG. 10(f)).

Masculine sound plural adds two suffixes to the singular word: ون wn or ين yn based on the aspect of the word. The following rules are used in converting the ArSL signs into masculine sound plurals:—

- If the word ends with ى Y "Alif maqsurah", then replace it with ون wn (FIG. 10(g)).
- If the word ends with ي y 'Yaa', then replace it with ون wn or ين yn based on the word aspect (FIG. 10(h)).

(d) Pronoun Agreement

Figure 11:
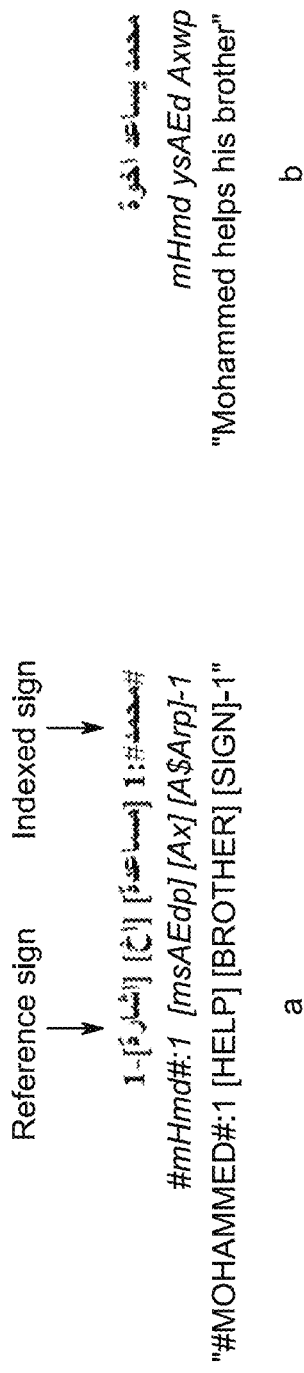
FIG. 11 is a diagram of an example technique for representing an attached pronoun in ArSL by indexing in accordance with some implementations.

ArSL uses indexing to refer to person, location, or object already signed in the sentence (more information about indexing can be found in section 2.3). Arabic attached pronouns are represented in ArSL using indexing. ArSL uses [اشارة] [A$Arp] "[SIGN]" reference sign to refer to the indexed sign in the sentence. FIG. 11 shows an example of indexing in ArSL. As shown in the figure, the [اشارة] [A$Arp] "[SIGN]" refers to the indexed sign #محمد ##mHmd# "#MOHAMMED#" that has an index of 1. This reference indicates that the signer is talking about Mohammeds' brother.

To translate the ArSL indexing into Arabic attached pronouns, the system performs Algorithm 2

---

Algorithm 2 Translating ArSL indexing sign into Arabic attached pronoun algorithm Require: indxdSgn: Indexed sign, prevWord: word preceeding the reference sign
Ensure: wrdWithPronoun: prevWord with attached pronoun
1:  switch indxdSgn do
2:    case انا AnA "I"
3:      wrdWithPronoun = prevWord + ي y
4:    case نحن nHn "WE"
5:      wrdWithPronoun = prevWord + نا nA
6:    case انت Ant "YOU"
7:      wrdWithPronoun = prevWord + ك k
8:    case انتما AntmA "YOU for dual"
9:      wrdWithPronoun = prevWord + كما kmA
10:   case انتم Antm "YOU"
11:     if gender is masculine then
12:       wrdWithPronoun = prevWord + كم km
13:     else -continued

| Algorithm 2 Translating ArSL indexing sign into Arabic attached pronoun algorithm |
|---|
| 14:    wrdWithPronoun = prevWord + ي kn |
| 15:    end if |
| 16:    case هو hw "HE" or indxdSgn is a singular 3$^{rd}$ person |
| 17:    if gender is masculine then |
| 18:        wrdWithPronoun = prevWord + ه h |
| 19:    else |
| 20:        wrdWithPronoun = prevWord + ها hA |
| 21:    end if |
| 22:    case هما AntmA "YOU" or indxdSgn is a dual 3$^{rd}$ person |
| 23:        wrdWithPronoun = prevWord + هما hmA |
| 24:    case هم hm "THEY" or indxdSgn is a plural 3$^{rd}$ person |
| 25:    if gender is masculine then |
| 26:        wrdWithPronoun = prevWord + هم hm |
| 27:    else |
| 28:        wrdWithPronoun = prevWord + هن hn |
| 29:    end if |

Algorithm 2 adds an attached pronoun to the word preceding the referencing sign. The algorithm is based on the following rules:

If the indexed sign is for the first person in the conversion, signer, then:
If the indexed sign is انا AnA "I", then add ي y to the word preceding the reference sign (for example, [بيت] [byt] "[HOME]"→بيتي byty "my home").
If the indexed sign is نحن nHn "WE", then add نا nA to the word preceding the reference sign (for example, [بيت] [byt] "[HOME]"→بيتنا bytnA "our home").
If the indexed sign is for the second person, addressee, then:
If the indexed sign is انت Ant "YOU", then add ك k to the word preceding the reference sign (for example, [بيت] [byt] "[HOME]"→بيتك bytk "your home").

If the indexed sign is انتما AntmA "YOU for dual", then add كما kmA to the word preceding the reference sign (for example, [بيت] [byt] "[HOME]"→بيتكما bytkmA "your home").
If the indexed sign is انتم Antm "YOU" and its gender is masculine, then add كم km to the word preceding the reference sign (for example, [بيت] [byt]"[HOME]"→ بيتكم bytkm "your home"), else add كن kn (for example, [بيت] [byt] "[HOME]"→بيتكن bytkn "your home").
If the indexed sign is for the third person, then:
If the indexed sign is هو hw "HE" or singular, then add ه h (for example, [بيت] [byt] "[HOME]"→بيته byth "his home") if the gender is masculine otherwise add ها hA (for example, [بيت] [byt] "[HOME]"→ بيتها bythA "her home").

If the indexed sign is هما AntmA "You" or is dual, then add هما hmA to the word preceding the reference sign (for example, [بيت] [byt] "[HOME]" →بيتهما bythmA "their home").
If the indexed sign is هم hm "THEY" or its gender is masculine, then add هم hm (for example, [بيت] [byt] "[HOME]"→بيتهم bythm "their home"), else add هن hn to the word preceding the reference sign (for example, [بيت] [byt]"[HOME]"→بيتهن bythn "their home"), (c) Verb and Subject Agreement ArSL uses the verb in present simple tense form with all tenses and it uses a dedicated sign to express the sentences' tense. FIG. 12 shows an ArSL sentence in past tense with its equivalent Arabic sentence. As shown in the figure, the قبل qbl "BEFORE" sign, which indicates that the sentence tense is in the past, is used at the beginning of the sentence while the verb sign, انتشار Ant$Ar "SPREAD", is expressed in the noun form.

To translate this sentence into Arabic, first retrieve the past verb corresponding to انتشار Ant$Ar "SPREAD" sign from ArSL dictionary. Some implementations include a modified ArSL dictionary that includes the past, present, and command forms of most of the dictionary' signs. The obtained verb form from the dictionary agrees only with the third masculine person subject. For example, the past and present of the انتشار [Ant$Ar]"[SPREAD]" sign are انتشر Ant$r "SPREAD" and ينتشر ynt$r "SPREAD", respectively. These two verb forms do not agree with the first and second person nor with the feminine third person. To make the verb agree with the subject, apply Algorithm 3 (see below). This algorithm makes the verb agree with the subject in gender and number. The algorithm uses the past and present verbs of the masculine 3rd singular person as input and returns the verb that agrees with the subject in the target tense. Table 3 summarizes the rules used in this algorithm.

| Verb | Subject | Masculine | | | Feminine | | |
|---|---|---|---|---|---|---|---|
| | | Singular | Dual | Plural | Singular | Dual | Plural |
| Past | 1$^{st}$ | P + ت | P + نا | P + نا | P + ت | P + نا | P + نا |
| | 2$^{nd}$ | P + ت | P + تما | P + تم | P + ت | P + تما | P + تن |
| | 3$^{rd}$ | P | P + ا | P + وا | P + ت | P + تا | P + ن |
| Present | 1$^{st}$ | ا + V* | ن + V* | ن + V* | ا + V* | ن + V* | ن + V* |
| | 2$^{nd}$ | ت + V* | ت + V* + ان | ت + V* + ون | ت + V* + ن | ت + V* + ان | ت + V* + ن |
| | 3$^{rd}$ | V | V* + ا | V* + ون | ت + V* | ت + V* + ان | ت + V* + ن |
| Future | 1$^{st}$ | سا + V* | سن + V* | سن + V* | سا + V* | سن + V* | سن + V* |
| | 2$^{nd}$ | ست + V* | ست + V* + ان | ست + V* + ون | ست + V* + ن | ست + V* + ان | ست + V* + ن |
| | 3$^{rd}$ | سي + V* | سي + V* + ا | سي + V* + ون | ست + V* | ست + V* + ان | سي + V* + ن |

Figure 13:
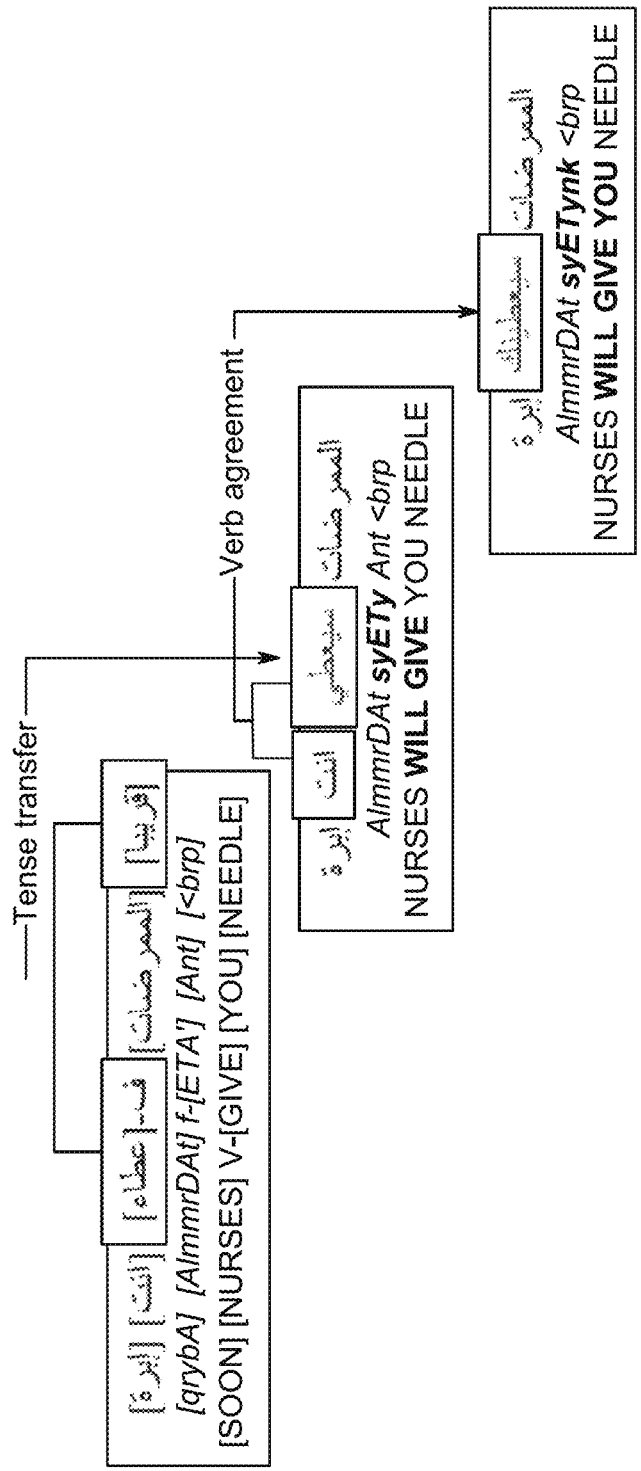
FIG. 13 is a diagram of an example process to change the verb to agree with the subject in person, gender, and number in accordance with some implementations.

An example of verb agreement is shown in FIG. 13. As shown in the figure, the [اعطاء] [ETA'] "[GIVE]" sign verb is first translated into future tense and the tense sign [قريبا] [qrybA] "[SOON]" is removed. Then, the verb, سيعطي syETy "will give", is modified to agree with the subject [الممرضات] [AlmmrDAt] "[NURSES]" in number and gender. Finally, the detached pronoun [انت] [Ant] "[YOU]" is removed and the attached pronoun ك k is attached to the verb to result in the word سيعطينك syETynk "will give you".

Phrase Level Transformation

The ArSL phrase differs from Arabic phrase in the structure and agreement between phrase words. At this translation level, the ArSL phrases are transferred into their Arabic equivalent.

Unlike Arabic, ArSL uses the negation sign after the verb and adjective such as [يوجد] [لا] [ywjd] [lA] "[EXIST] [NO]". Transfer ArSL negation phrase into Arabic by moving the negation word before the verb or adjective. However, ArSL negation signs are limited to [ابدا] [AbdA']\"[NEVER]" and [لا] [lA]\[NO]" signs and only shifting these words before the verb or adjective words may result in inaccurate meaning as in this example:

[سعيد] [لا] [sEyd] [lA] "[HAPPY] [NO]"→لا سعيد lA sEyd "no happy"

To address this, replace the negation sign word لا lA "NO" with [غير، لا، ليست، ليس، لن، لم] lA, gyr, lys, lyst, lm, ln and select the appropriate negation word using language model in the post-processing stage.

ArSL time modifier words, such as [قبل] [qbl] "[BEFORE]" and [بعد] [bEd]"[AFTER]", which are typically placed before the time words in Arabic, are used after the time signs in ArSL.

For example, the Arabic phrase بعد الاجازة bEd AlAjAzp "after vocation" is expressed in ArSL as [اجازة] [بعد] [AjAzp] [bEd] "[VOCATION] [AFTER]." To translate this phrase into Arabic, move the time modifier words before the time clause.

Sentence Level Transformation

After applying the transformations at word and phrase levels, transform the ArSL sentence structure to meet the structure of the Arabic sentence. Table 4 shows the main differences between Arabic and ArSL sentences. Question sentences in ArSL usually start with a question mark and end with a question word. In addition, ArSL has limited question words. Transferring these words into their equivalent Arabic is performed at the word level. Then, change the structure by moving the question word to the beginning of the sentence and the question mark to the end of the sentence.

ArSL sentences can have object-verb structure which is uncommonly used in Arabic, so this structure is transformed into verb-object structure. In addition, the verb-subject structure of ArSL sentence is transformed into subject-verb Arabic structure which is more common than verb-subject.

Command sentences are expressed in ArSL by placing the pronoun at the beginning of the sentence followed by the main verb of the sentence. Words such as [لازم] [lAzm]" [MUST]" are used to indicate that this verb is compulsory. For example, the Arabic sentence اذهب الى الطبيب A*hb AlY AlTbyb "Go to the doctor" is expressed in ArSL as [أنت][لازم] ف-[ذهاب][طبيب] [Ant] [lAzm] f-[*hAb] [Tbyb] "[YOU] [MUST] [GO][DOCTOR]." Transferred the ArSL command sentence into Arabic by removing the pronoun sign, [لازم] [lAzm] "[MUST]", and changing the verb into a command form. This transformation involves also verb agreement with the subject in person, gender, and number. The same rules discussed above are followed to make the verb and subject agrees in person, gender, and number.

Post-Processing

Some ArSL signs are translated in the previous translation stages into more than one Arabic word.

For example, ArSL plural sign can be translated into two forms of Arabic masculine plural words and selecting among these candidate words depends on the plural word aspect. To select among these words and preserve the meaning of the sentence, a statistical language model was employed.

A 4-gram language model was built with KenLM toolkit. (See, e.g., K. Heaeld, *KenLM: Faster and smaller language model queries*, in Proceedings of the Sixth Workshop on Statistical Machine Translation. Association for Computational Linguistics, 2011, pp. 187-197, which is incorporated herein by reference). KenLM was used (with Kneser-Ney smoothing and default backoff) because it uses less memory and is faster than SRILM and IRSTLM. (See, e.g., K. Heaeld, *KenLM: Faster and smaller language model queries*, in Proceedings of the Sixth Workshop on Statistical Machine Translation. Association for Computational Linguistics, 2011, pp. 187-197, and A. Stolcke, *SRILM—an extensible language modeling toolkit*, in Proceedings International Conference on Spoken Language Processing, 2002, pp. 257-286, and M. Federico, N. Bertoldi, and M. Cettolo, *IRSTLM: an open source toolkit for handling large scale language models*, in Interspeech, 2008, pp. 1618-1621, each of which is incorporated herein by reference). The candidate words are scored using KenLM, and the high score word is selected.

TABLE 4

Differences between Arabic and ArSL sentences

| | Arabic | ArSL |
|---|---|---|
| 1 | SVO | SVO or SOV |
| 2 | VOS | SVO or SOV |
| 3 | VS | SV |
| 4 | VSO | SVO or SOV |
| 5 | SOV | SVO or SOV |
| 6 | OSV | SVO or SOV |
| 7 | Question word + [Arabic Sentence] ? | ? + [ArSL sentence] + Question word |
| 8 | Negation + [Arabic Sentence] | [ArSL Sentence] + { [iAynjd] "[NOT EXIST]" / [AbdA'] "[NEVER]" / [lA] "[NO]" } |
| 9 | { [qbl] [BEFORE] / [bEd] [AFTER] } + Time words | Time words + { [qbl] [BEFORE] / [bEd] [AFTER] } |

TABLE 4-continued

Differences between Arabic and ArSL sentences

| Arabic | ArSL |
| --- | --- |
| 10 Dual nouns | Gender + [Noun] + [اثنان][AvnAn] "[TWO]"(Human) |
| | [اثنان] [AvnAn] "[TWO]" + Gender + [Noun] (Non-human) |
| 11 Plural nouns | Gender + [Noun] + [ثلاث] [vlAvp] "[THREE]"(Human) |
| | Noun + [كثير] [kvyr] "[MUCH]"(Non-Human) |

Defining a Gloss Annotation System for Transcribing ArSL Textual

Sign language is a visual language that uses body language to convey meaning. The transcription of such language requires writing systems that can represent various parameters of the sign language, such as the signs, hand shapes, and facial expressions. There are several notation methods to represent sign language, which can be categorized as symbolic or texture. Symbolic notation systems, such as Stokoe and HamNoSys, depend on symbols for sign representation, as shown in FIG. 14(a-b) (see, e.g., W. Stokoe, *Sign language structure: An outline of the visual communication systems of the American deaf*, Journal of deaf studies and deaf education, vol. 10, no. 1, pp. 3-37, 2005, and S. Bentele, *About the HamNoSys system*, URL: http://www.signwriting.org/forums/linguistics/ling007.html. Last visit: April, 2017, 2017, each of which is incorporated herein by reference). FIG. 14(a-b) shows the "SNAKE"1 and "HOUSE"2 signs annotated using stokoe and HamNoSys notation systems, respectively. However, these systems are textually complex and cannot easily represent the sign language parameters (see, e.g., N. Aouiti, M. Jemni, and S. Semreen, *Arab gloss annotation system for Arabic sign language*, in Information & Communication Technology and Accessibility (ICTA), 2015 5th International Conference on. IEEE, 2015, pp. 1-6, which is incorporated herein by reference). The gloss notation is a textual representation of sign languages, as shown in FIG. 14(c). Unlike other systems, the glossing notation avoids the complexity of understanding other systems and does not require prior knowledge of the sign symbols.

The ASL signs are represented in the glossing system by capital-letter English words, e.g., CHEESE ("cheese") or MAN ("man"). If a single sign consists of more than one word, a hyphen is used between them, e.g., DON'T-KNOW ("don't know"). Finger-spelled words are represented using fs—in front of the word, such as fs-JOHN ("John"). ASL compound signs are linked by "+," such as MOTHER+ FATHER ("parent"), whereas "++" is used to indicate that the sign is repeated.

Non-manual signs, which simultaneously appear with the manual sign(s), are represented in the ASL gloss by overlines, as shown in FIG. 15, which also shows an information question marker (WH), which indicates that the eyebrows should be squinted. The "q" marker is used to represent questions that are answered with a simple yes or no. This marker indicates that the eyebrows should be raised. The ASL glossing system uses other markers to represent other non-manual signs, such as a negative statement "n," yes response "y," and rhetorical question "rq."

To the knowledge of the present inventors, the ArSL does not have proper gloss notation. ASL gloss could not be used for ArSL because the languages use different scripts. In addition, it could not be used with the transliterated Arabic characters because the character case (capital or small) has a meaning in Arabic transliteration systems, such as Buckwalter. One previous attempt to develop gloss notation for ArSL was by Aouiti et al., who translated the notations of the ASL glossing system to be used for ArSL (see, e.g., N. Aouiti, M. Jemni, and S. Semreen, *Arab gloss annotation system for Arabic sign language*, in Information & Communication Technology and Accessibility (ICTA), 2015 5th International Conference on. IEEE, 2015, pp. 1-6, which is incorporated herein by reference). However, their notation does not consider the differences between ASL and ArSL. For example, Aouiti et al. used the annotation 1-ج-د 1-g-D for هو hw "he" and هي hy "she" pronouns, whereas there are two different signs for these pronouns in ArSL. In addition, 1-ج-ملك 1-g-mlk is used for absent pronouns, which are not used in ArSL. Thus, a new glossing method for ArSL is disclosed herein. The disclosed new method follows certain guidelines for ASL glossing with several changes to suit ArSL (see, e.g., S. K. Liddell, *Grammar, gesture, and meaning in American Sign Language*. Cambridge University Press, 2003, which is incorporated herein by reference).

The sign of ArSL is represented in the presently disclosed glossing system between two brackets. This method removes the need for using a hyphen (as in the ASL glossing system) to represent a sign language word or sign that consists of more than one word. Finger spelling is represented in the ArSL gloss by # before and after the sign to be finger-spelled, as shown in FIG. 3. Repetition is represented by "+" after the sign, and the number of "plus" symbols reflects the number of repetitions. Sign emphasization is represented in the proposed glossing method using the '-ت' -t symbol after the sign.

Markers (to represent non-manual expressions) are represented in the glossing notation using hyphen ("-") followed by the marker letter attached to the end of the sign(s). Table 2 shows the question markers ـس -s and ـست -st attached to the ArSL question sentences. Other ASL gloss markers can be used in the glossing system by attaching to the end of the sign(s) gloss. For signs that involve articulation in a locus position, the location, object, or person is indicated with an index following the gloss. The indexed person, location, or object can be referred using the [ أشارة ] A$Arp "SIGN" ]—sign followed by the index of the person, location, or object. Table 5 summarizes the gloss notations in the proposed glossing system.

| Gloss | Description | Arabic example | ArSL eequivlent |
|---|---|---|---|
| [sign] | Sign exists in ArSL dictionary | 'home' byt بيت<br>وزارة الصحة<br>wzArp AlSHp<br>'Ministry of Health' | '[HOME]'[byt] [بيت]<br>[وزارة الصحة]<br>[wzArp AlSHp]<br>'[MINISTRY OF HEALTH]' |
| #NAME# | Finger spelling of signs not in dictionary like names | 'Sami' sAmy سامي | '#SAMI#' #sAmy# #سامي# |
| [[sign]s]-*st* انت حزين | Yes/No question that indicates that your eyebrows should be raised | انت حزين؟<br>Hzyn Ant<br>'Are you sad?' | [[انت]][[حزين]]-ست<br>[[Hzyn] [Ant]-st<br>'[[SAD] [YOU]] -st' |
| [[sign]s]-*s* | Wh questions indicates that your eyebrows should be squinted | اسمك؟<br>Asmk?<br>Your name? | [اسم]-س<br>[Asm]-s<br>'[NAME]-s' |
| [sign]+ | Repetition. Each '+' corresponds to one repetition | اعمدة<br>AEmdp<br>'Poles' | [اعمود]++<br>[Emwd]++<br>'[POLE]++' |
| [sign]-*t* | Emphasize the sign | شديد الم<br>$dyd Al>lm<br>'very pain' | [الم]-ت<br>[Alm]-t<br>'[PAIN]-t' |
| [sign]: INDEX | Indexing: Pointing toward a certain location, object, or person and use it for future referencing. We can later use it with a sign by using the followed by _INDEX | محمد يساعد اخوه ولكن<br>اخوه غير سعيد<br>mHmd ysAEd Axwp<br>wlkn Axwp gyr sEyd | [#محمد#]:1 [مساعد]] [اخ]-2<br>[1 [لكن] [اخ]-2 [سعيد] [لا]<br>[#mHmd#]:1 [msAEdp] [Ax]-2<br>[A$Arp]-1 [lkn] [A$Arp]-2 [sEyd] [lA] |
| اشارة A$Arp 'SIGN']-_Index | Referring to a person, location, or object already indexed by INDEX. | 'Mohammed helps his brother but his brother is unhappy' | '#MOHAMMED#:1 [HELP] [BROTHER]:2 [SIGN]-1 [BUT] [SIGN]-2 [HAPPY] [NO]' |

Machine translation between Arabic and ArSL is a bidirectional problem. The first part is to translate Arabic sentences into ArSL. The second part is to translate ArSL sentences resulting from ArSL recognition systems into Arabic with correct structure and grammar.

Translation of Arabic into ArSL is important for communication between hearing people and deaf.

Most of the hearing people depend on either experts or writing to interact with deaf. The first method is costly and unavailable most of the time. In addition, using writing for interaction with deaf is not helpful with illiterate deaf.

Translating Arabic, speech or text, into ArSL is needed to communicate with deaf and to translate messages, addresses, and educational materials into ArSL without involving expert translators.

However, translating Arabic into ArSL faces some challenges such as lack of comprehensive corpus.

In addition, few linguistic studies cover ArSL grammar and structure (see, e.g., A. Almohimeed, M. Wald, and R. Damper, *Arabic text to Arabic sign language translation system for the deaf and hearing-impaired community*, in Proceedings of the Second Workshop on Speech and Language Processing for Assistive Technologies. Association for Computational Linguistics, 2011, pp. 101-109, which is incorporated herein by reference).

ArSL machine translation is still in its infancy compared with other sign languages (see, e.g., A. A. I. Sidig, H. Luqman, and S. A. Mahmoud, *Arabic sign language recognition using optical flow-based features and HMM*, in Recent Trends in Information and Communication Technology. Cham: Springer International Publishing, 2018, pp. 297-305, which is incorporated herein by reference). Several machine translation approaches have been proposed for other sign languages such as American sign language (ASL), British sign language (BSL), and Dutch sign language (DSL)(see, e.g., L. Zhao, K. Kipper, W. Schuler, C. Vogler, N. Badler, and M. Palmer, *A machine translation system from English to American sign language*, in Conference of the Association for Machine Translation in the Americas.

Springer, 2000, pp. 54-67; 1. Marshall and E. Safar, *A prototype text to British sign language (BSL) translation system*, in Proceedings of the 41st Annual Meeting on Association for Computational Linguistics-Volume 2. Association for Computational Linguistics, 2003, pp. 113-116; and S. Morrissey and A. Way, *An example-based approach to translating sign language*, 2005, each of which is incorporated herein by reference). These approaches vary mainly on the used translation technique. Most of these approaches were rule based.

Direct translation is used by TESSA system to translate the English text into its equivalent BSL signs (see, e.g., S. Cox, M. Lincoln, J. Tryggvason, M. Nakisa, M. Wells, M. Tutt, and S. Abbott, *The development and evaluation of a speech-to-sign translation system to assist transactions*, International Journal of Human-Computer Interaction, vol. 16, no. 2, pp. 141-161, 2003, which is incorporated herein by reference). Transfer-based translation is used by most of the sign language translation systems such as ZARDOZ, ASL Workbench, ViSiCAST, Albuquerque Weather, South African sign language machine translation system, and Spanish sign language translation system (see, e.g., T. Veale, A. Conway, and B. Collins, *The challenges of cross-modal translation: English to-sign-language translation in the Zardoz system*, Machine Translation, vol. 13, no. 1, pp. 81-106, 1998; L. S. d'Armond, *Representation of American sign language for machine translation*, Ph.D. dissertation, Georgetown University, 2002; I. Marshall and E. Safar, *Extraction of semantic representations from syntactic SMU link grammar linkages*, Proceedings of Recent Advances in Natural Language Processing, pp. 154-159, 2001; A. B. Grieve-Smith, *English to American sign language machine translation of weather reports*, in Proceedings of the Second High Desert Student Conference in Linguistics (HDSL2), Albuquerque, N. Mex., 1999, pp. 23-30; L. Van Zijl and A. Combrink, *The South African sign language machine translation project: issues on non-manual sign generation*, in Proceedings of the 2006 annual research conference of the South African institute of computer scientists and information technologists on IT research in developing countries. South African Institute for Computer Scientists and Information Technologists, 2006, pp. 127-134; and R. San-Segundo, J. M. Montero, J. Macas-Guarasa, R. Cordoba, J. Ferreiros, and J. M. Pardo, *Proposing a speech to gesture translation architecture for Spanish deaf people*, Journal of Visual Languages & Computing, vol. 19, no. 5, pp. 523-538, 2008, each of which is incorporated herein by reference). TEAM system used interlingua-based approach for translating English into ASL. See, e.g., L. Zhao, K. Kipper, W. Schuler, C. Vogler, N. Badler, and M. Palmer, *A machine translation system from English to American sign language*, in Conference of the Association for Machine Translation in the Americas. Springer, 2000, pp. 54-67, which is incorporated herein by reference).

Huenerfauth proposed a system combining direct, transfer, and interlingual methodologies into one system to translate English into ASL (see, e.g., M. Huenerfauth, M. Marcus, and M. Palmer, *Generating American sign language classifier predicates for English-to-ASL machine translation*, Ph.D. dissertation, University of Pennsylvania, 2006, which is incorporated herein by reference). Other systems started using data-driven techniques for sign language translation such as statistical machine translation (SMT) and example-based machine translation (EBMT) (see, e.g., S. Morrissey and A. Way, *An example-based approach to translating sign language*, 2005; A. Othman and M. Jemni, *Statistical sign language machine translation: from English written text to American sign language gloss*, arXiv preprint arXiv:1112.0168, 2011; and M. E. Bonham, English to ASL gloss machine translation, 2015, each of which is incorporated herein by reference). However, the accuracy of these systems depends on the size of the parallel corpus which is usually limited for most sign languages.

A number of attempts have been made during the last decade to develop machine translation systems for translating Arabic text into ArSL. Almasoud used translation rules to translate Arabic text into ArSL (see, e.g., A. M. Almasoud and H. S. Al-Khalifa, *Semsignwriting: A proposed semantic system for Arabic text-to-signwriting translation*, Journal of Software Engineering and Applications, vol. 5, pp. 604-612, 2012, which is incorporated herein by reference). The input text is morphologically analyzed and the ArSL rules are applied on each Arabic word to transform it into its equivalent sign. The domain ontology of each word is searched to get the words' sign code in SignWriting database which is used for retrieving the equivalent Sign Writing symbol. If the sign code of the word is not found, then the sign code of one of its synonyms is returned or the word is finger spelled. To evaluate the proposed system, an expert is consulted. The used corpus is limited to only 54 instances so most of the words expected to be finger spelled.

A corpus-based approach for translating Arabic text into ArSL using chunk-based EBMT is used by Almohimeed et al (see, e.g., A. Almohimeed, M. Wald, and R. Damper, *Arabic text to Arabic sign language translation system for the deaf and hearing impaired community*, in Proceedings of the Second Workshop on Speech and Language Processing for Assistive Technologies. Association for Computational Linguistics, 2011, pp. 101-109, which is incorporated herein by reference). To ensure only one output of the morphological analyzer, the input sentence is diacriticized using Google Tashkeel on the pre-processing step. The output of the morphological analyzer is matched against chunks in the chunk table. If the chunk is not found, a word to sign translation is performed using the sign dictionary. To evaluate the system, a corpus for instructional language with 203 signed sentences is used with an expert and Leave-one-Out (LOO) evaluation techniques. Using LOO evaluation technique, a 46.7% word error rate (WER) and 29.4% average position-independent WER are reported. EBMT depends on the examples quality and their similarity to the input text. In addition, Google Tashkeel project is not continued.

An algorithm to convert Arabic text sentences into ASL has been described previously (see, e.g., S. Al-Rikabi and V. Hafner, *A humanoid robot as a translator from text to sign language*, 5th Language and Technology Conference: Human Language Technologies as a Challenge for Computer Science and Linguistics (LTC 2011), pp. 375-379, 2011, which is incorporated herein by reference). The algorithm starts by using morphological analyzer to find the root of verb words in the sentence and extracts other features depending on the morphological pattern. Then syntax analysis is performed to build the parse tree using dependence grammar concept. The nominal sentences are directly mapped into ASL while other sentences are converted into "Time-Comment". Finally, a robot is developed to search for each word of the ASL tree in the ASL dictionary and performs it directly. If there is no word matching in the ASL dictionary, the robot performs full sign of the word using the word features extracted by morphological and syntax analyzers. Al et al. proposed a translation system from Arabic text into ArSL based on a knowledge base (see, e.g., E. A. A. E. E., E. M. M. R. Basuony, and E. S. M. Atawy, *Intelligent Arabic text to Arabic sign language translation for easy deaf communication*, International Journal of Computer Applications, vol. 92, no. 8, pp. 22-29, 2014, which is incorporated herein by reference). A rule-based technique is used to convert the root of the sentence words, which are extracted by morphological analyzer, into its equivalent sign. Word synonym is used for words that do not have an equivalent in the ArSL dictionary. Otherwise, the word is finger spelled. The proposed system is evaluated by five experts using 101 sentences and 97.7% F-score is reported. This work covers only nominal sentences and ignores other sentence types.

Other researches targeted mobile applications (see, e.g., M. Mohandes, *Automatic translation of Arabic text to Arabic sign language*, AIML Journal, vol. 6, no. 4, pp. 15-19, 2006; S. M. Halawani, *Arabic sign language translation system on mobile devices*, IJCSNS International Journal of Computer Science and Network Security, vol. 8, no. 1, pp. 251-256, 2008; H. S. Al-Khalifa, \Introducing Arabic sign language for mobile phones," in International Conference on Computers for Handicapped Persons. Springer, 2010, pp. 213-220; F. Al Ameiri, M. J. Zemerly, and M. Al Marzouqi, *M-learning and chatting using indexed Arabic sign language*, International Journal for Infonomics (IJI), vol. 5, p. 10, 2012; and A. Al-Nafjan, B. Al-Ari, and A. Al-Wabil, *Design and development of an educational Arabic sign language mobile application: Collective impact with Tawasol*, in International Conference on Universal Access in Human-Computer Interaction. Springer, 2015, pp. 319-326, each of which is incorporated herein by reference). These systems applied direct machine translation by translating each word in the input sentence into its corresponding sign in the sign dictionary or spelling it for missing equivalent sign. These systems wrongly assumed that the grammar of ArSL is similar to Arabic language. (See, e.g., A. Almohimeed, M. Wald, and R. Damper, *Arabic text to Arabic sign language translation system for the deaf and hearing-impaired community*, in Proceedings of the Second Workshop on Speech and Language Processing for Assistive Technologies. Association for Computational Linguistics, 2011, pp. 101-109, which is incorporated herein by reference). In addition, the semantic of the input sentence is ignored in the translation process.

Conventionally available ArSL recognition systems typically perform direct mapping between signs in ArSL sentence and their equivalent Arabic words. This preserves the structure and grammar of ArSL sentence and ignores the structure and grammar of the target language, Arabic. This type of translation results in Arabic sentences difficult to understand by an average Arabic speaker. In addition, using the resulting sentence as an input for web search may not retrieve the required information by the deaf. In order to convert the generated sentences into correct Arabic sentences with correct structure and grammar a machine translation system to translate the sentence resulting from ArSL recognition system into Arabic is described herein. Conventional ArSL recognition systems output the recognized sentences in their original structure and depend on the end-user to understand the meaning of the sentence.

Below is presented results of extensive experimental evaluation of the presently disclosed systems by the present inventors. Beginning with a description of the dataset used in the experiments and followed by a description of the experimental results of Arabic to ArSL and ArSL to Arabic translation systems.

This work had no established base of word lists or corpus; hence, the present inventors engaged in data collection.

Figure 16:
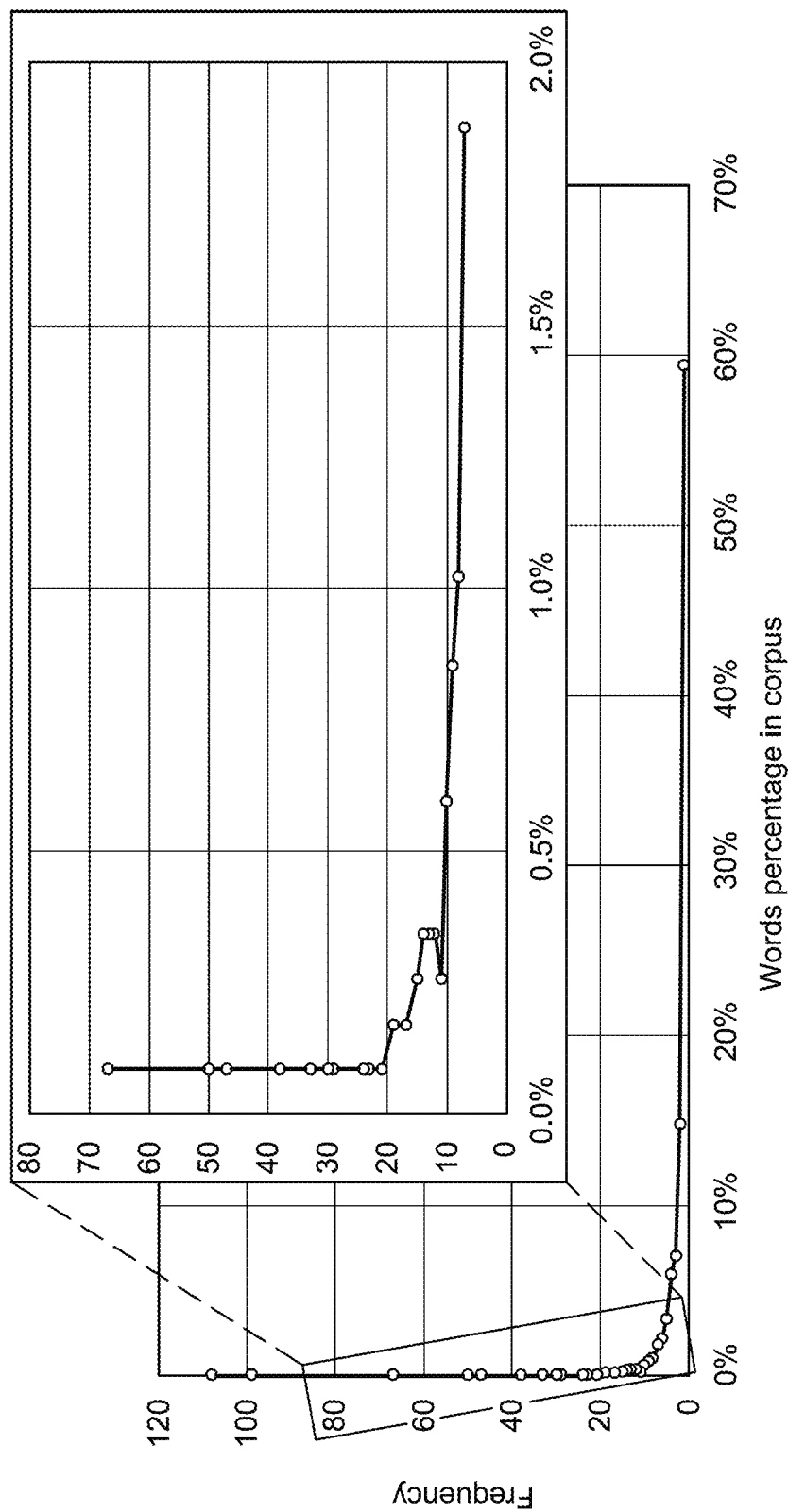
FIG. 16 is a diagram showing example word frequency in the corpus in accordance with some implementations.

The health domain was targeted in building the corpus. A bilingual parallel corpus of 600 sentences was prepared. The corpus is annotated using the proposed glossing system discussed above. The sentences of the database are real-life sentences that are used in medical centers. These sentences cover nearly all Arabic sentence types (e.g., verbal, nominal, questions). There are 3,294 words in the corpus (1,172 unique words), and the average sentence length is 5.5 words. FIG. 16 shows the frequency of words appearing in the corpus. As shown in the figure, the corpus has a large number of unique words as more than 85% of the words in the corpus appeared less than 5 times.

The large number of unique words makes the corpus appropriate for evaluating real world ArSL translation systems. The sign language portion of the corpus consists of two translations of each sentence translated by one deaf person and one expert bilingual translator. The two translations have lexical or structural differences, but both preserve the meaning of Arabic sentences. This variation may be attributed to how the translator conveys the meaning of the Arabic sentence to the deaf. FIG. 17 shows an example of two translations of an Arabic sentence. In particular, as shown in FIG. 17, both translations have the same meaning but differ in structure and the use of additional words to clarify the meaning to the deaf. The corpus was divided into training (70%), development (15%), and testing (15%) sets.

In addition, the ArSL dictionary is available as images with an Arabic annotation for each sign. This annotation does not follow a consistent rule for annotation, as shown in FIG. 18, where some signs are annotated using the noun form (FIG. 18(a)), whereas others with the verb form (FIG. 18(b)). To handle this issue and make the dictionary usable for natural language processing (NLP) tasks, each sign in the ArSL dictionary was re-annotated using the following information: SID, Word, Lemma, and Translation. SID is a unique number for each sign in the dictionary, Word is the Arabic annotation of the sign used by the ArSL dictionary authors, lemma is the lemma of the sign word, and Translation is the English translation of the sign.

The translation output of Arabic to ArSL translation system was manually evaluated by experts and automatically evaluated using different evaluation metrics.

All Arabic sentences in the testing set were fed into the translation system, and the translated ArSL sentences were manually evaluated by two ArSL experts. The outputs of the translation system were evaluated and divided into three groups based on their translation quality: good, fair, and poor.

The good metric is used with sentences that are grammatically correct and have the correct meaning. An example of the translation that is evaluated as good is shown in FIG. 19(a).

The fair metric is typically used for a sentence that has the correct meaning but misses certain grammatical details. FIG. 19(b) shows an example of a sentence with a fair evaluation. Removing the preposition [منذ] [mn*] "[SINCE]" adds ambiguity regarding the next word [ولادة] [wlAdp] "[BIRTH]" and its relation to the sentence, but the sentence can be understood by the deaf person.

The poor metric is used with sentences that have partially or completely incorrect translation.

FIG. 19(c) shows an example of a sentence evaluated as a poor translation. The word احد AHd "someone" in this example is translated as [الأحد] [Al>Hd] "[SUNDAY]," which makes the sentences convey incorrect meaning. In addition, the phrase احد افراد اسرتك AHd AfrAd Asrtk "One of your family" is a difficult composition for the rule-based translation.

The manual evaluation results are 82%, 8%, and 10% for good, fair, and poor, respectively.

These results demonstrate that the translation system provides good translation for approximately 82% of the translated sentences.

Figure 20:
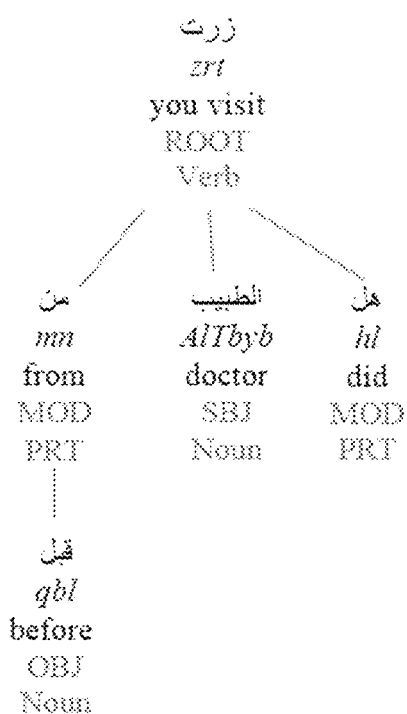
FIG. 20 is a diagram showing an example of inaccurate parsing in accordance with some implementations.

Based on the manually evaluation results, the sentences that obtain poor evaluation have grammatical problems. This result is attributed to two main reasons: the morphological analyzer and parser. Both tools are trained on an Arabic news corpus, which is considerably different from the type of data that used, which are more conversational and related to the health domain. For example, the aspect feature of the word اسأل AsAl "ask" in the sentence اسأل الموظف عن رقم ملفك AsAl AmwZf En rqm mlfk "Ask the employer about your file number" is not recognized by the morphological analyzer as a command, which increases the difficulty of determining the verb tense in the sentence. In addition, the subject in this sentence is recognized by the morphological analyzer as the speaker, which is incorrect. However, the majority of the translation errors are related to the parser. The parsing was incorrect for certain sentences, as shown in FIG. 20. The word الطبيب AlTbyyb "doctor" in this tree is incorrectly Identified by the parser as the subject of the sentence. This type of error is common in Arabic parsing (see, e.g., Y. Marton, N. Habash, and O. Rainbow, *Dependency parsing of Modern Standard Arabic with lexical and inflectional features*, Computational Linguistics, vol. 39, no. 1, pp. 161-194, 2013, which is incorporated herein by reference).

Manual evaluation is typically subjective and expensive. Automatic evaluation helps to make comparisons with other works. BiLingual Evaluation Understudy (BLEU), Word Error Rate (WER), and Translation Error Rate (TER) metrics were used to evaluate the translation (see, e.g., M. Gonzalez, J. Gimenez, and L. Marquez, *A Graphical Interface for MT Evaluation and Error Analysis*, in The 50th Annual Meeting of the Association for Computational Linguistics, 2012, which is incorporated herein by reference). BLEU performs exact n-gram (e.g., a 4-gram) matching between candidate and reference sentences. (See, e.g., K. Papineni, S. Roukos, T. Ward, and W.-J. Zhu, *BLEU: a method for automatic evaluation of machine translation*, in Proceedings of the 40th annual meeting on association for computational linguistics. Association for Computational Linguistics, 2002, pp. 311-318, which is incorporated herein by reference).

The 4-gram was used because the average number of words per sentence in the corpus is about four words. BLEU score ranges from 0 to 1, where 1 indicates an exact match between the candidate and reference translations. The WER is based on the Levenshtein distance between the candidate and the reference sentence, whereas the TER measures the amount of post-editing required to change a system output to exactly match a reference translation (see, e.g., S. Nießen, F. J. Och, G. Leusch, H. Ney, and L. F. Informatik, *An evaluation tool for machine translation: Fast evaluation for MT research*, in Proceedings of the 2nd International Conference on Language Resources and Evaluation (LREC-2000), 2000; and M. Snover, B. Dorr, R. Schwartz, L. Micciulla, and J. Makhoul, *A study of translation edit rate with targeted human annotation*, in Proceedings of association for machine translation in the Americas, vol. 200, no. 6, 2006, each of which is incorporated herein by reference).

The translation output was evaluated against two human translation references. The brackets and punctuations were excluded during the evaluation to avoid unnecessary matching. The words in the resulting ArSL sentences are in their lemma form because the ArSL dictionary uses the Arabic word lemma to annotate the sign image (Section 2.3). In contrast, some of the words in the human translated sentences are not in the lemma form. However, using the word or its lemma is correct as ArSL uses the sign for all word derivations. The output ArSL sentences was evaluated against the human translated references and results of 0.10, 0.70, and 0.71 were obtained using the BLEU, WER, and TER metrics, respectively. These metrics use strict word and phrase matching between the output of the translation system and the reference sentences and ignores that ArSL uses the same sign for all the word derivations which may justify the high error rate.

Therefore, the evaluation was performed using the lemma of the reference sentence which improved the BLEU to 0.35 and reduced the WER and TER to 0.55 and 0.53, respectively. These results are acceptable for ArSL translation considering that ArSL accepts different translations for the same sentence and uses the same sign for different derivations of a word. In addition, certain reference sentences were freely translated without constraint of the language grammar rules.

Test data of the ArSL corpus developed in connection with the disclosed subject matter was used to evaluate the disclosed translation system. An implementation of the machine translation system was evaluated manually and automatically. In manual evaluation, three Arabic native speakers evaluated the translation of each sentence as understandable, somehow understandable, and not understandable. The understandable metric is used with sentences that preserve the meaning of the source Arabic sentence and meet the grammar and structure of Arabic. Somehow understandable metric is used mainly with sentences that have a problem in the grammar or structure but the meaning of the sentence is preserved. Not understandable metric is used for sentence that has a different meaning than the source Arabic sentence.

The manual evaluation results are 80%, 12%, and 8% for understandable, somehow understandable, and not understandable metrics, respectively. These results show that the disclosed translation system provides an acceptable translation for approximately 92% of the translated sentences.

An example of sentences evaluated as understandable, somehow understandable, and not understandable are shown in FIG. 21. As shown in the figure, the meaning of the sentences evaluated as understandable is correct and the grammar and structure of the sentence correspond to Arabic.

Sentences evaluated as somehow understandable have an understandable meaning but some words are missed or extra characters are added. Not understandable sentences either miss some words that are important to convey the meaning of the sentence or have an issue in the structure and grammar of the sentence.

Missing words, such as pronouns, in the resulting sentence is due to the missing of these words in the source ArSL sentence due to the unavailability of the these words in the language vocabulary.

For example, the Arabic sentence الصدري من كسور يعاني القفص yEAny AlqfS AlSdry mn kswr "The rib cage suffers from fractures" is translated into ArSL as [كسر]++ [مشكلة] [القفص الصدري] [AlqfSAlSdry] [m$klp] [ksr]++"[RIB CAGE][PROBLEM] [FRACTURE]++" with missing the word بعاني yEAny "suffer" which is important to translate the ArSL sentence back into Arabic. In addition, the morphological analyzers that are used in analyzing the sentence failed in extracting the gender of some words correctly. For example, the gender of [بكتيريا] [bktyryA] "[BACTERIA]" word is incorrectly recognized by the morphological analyzer as male in [لا] [ضار] [البكتيريا] [نوع] [كل] [kl] [nwE] [AlbktyryA] [DAr] [lA] "[ALL] [TYPE][BACTERIA] [Harmful] [NO]" sentence and consequently the next word ضار DAr "Harmful" agrees with that word in gender whereas it should be ضارة DArp "Harmful".

Automatic evaluation metrics were used in evaluating the system. The BLEU, WER, and TER metrics were used to evaluate the translation (see, e.g., M. Gonzalez, J. Gimenez, and L. Marquez, *A Graphical Interface for MT Evaluation and Error Analysis*, in The 50th Annual Meeting of the Association for Computational Linguistics, 2012, which is incorporated herein by reference). The output sentences of the translation system were evaluated against Arabic source sentences of the ArSL sentences. Results of 0.39, 0.49, and 0.45 were obtained using the BLEU, WER, and TER metrics, respectively. These results are considered acceptable for translating ArSL sentence into Arabic because Arabic sentence can have different ArSL translations.

---

Algorithm 3 Make the verb agrees with subject in gender and number

Require: presentVerb: present verb of the masculine 3$^{rd}$ singular person, pastVerb: past verb of the masculine 3$^{rd}$ singular person, targetTense: target tense of the verb
Ensure: modifiedVerb: verb agrees with the subject in gender and number
1:  switch targetTense do
2:    case past
3:    switch subject do
4:      case 1$^{st}$ person                     Speaker
5:        switch Number do           Verb target number
6:          case singular
7:            modifiedVerb = P + ت

| Algorithm 3 Make the verb agrees with subject in gender and number |
|---|
| 8:     case dual or plural |
| 9:         modifiedVerb = P + ﺎ |
| 10:    case 2$^{nd}$ person                                    Addressee |
| 11:        switch Number do |
| 12:            case singular |
| 13:                modifiedVerb = P + ﺕ |
| 14:            case dual |
| 15:                modifiedVerb = P + ﺎﻤ |
| 16:            case plural |
| 17:                if gender is masculine then |
| 18:                    modifiedVerb = P + ﻢ |
| 19:                else |
| 20:                    modifiedVerb = P + ﻦ |
| 21:                end if |
| 22:    case 3$^{rd}$ person                              He or She or it |
| 23:        switch Number do |
| 24:            case singular |
| 25:                if gender is masculine then           Verb target gender |
| 26:                    modifiedVerb = P |
| 27:                else |
| 28:                    modifiedVerb = P + ﺕ |
| 29:                end if |
| 30:            case dual |
| 31:                if gender is masculine then |
| 32:                    modifiedVerb = P + ا |
| 33:                else |
| 34:                    modifiedVerb = P + ﺎ |
| 35:                end if |
| 36:            case plural |
| 37:                if gender is masculine then |
| 38:                    modifiedVerb = P + ﻮا |
| 39:                else |
| 40:                    modifiedVerb = P + ﻦ |
| 41:                end if |
| 42: case present |
| 43:    switch subject do |
| 44:        case 1$^{st}$ person |
| 45:            switch Number do |
| 46:                case singular |
| 47:                    modifiedVerb = ا + verbWithNoY |
| 48:                case dual or plural |
| 49:                    modifiedVerb = ن + verbWithNoY |
| 50:        case 2$^{nd}$ person |
| 51:            switch Number do |
| 52:                case singular |
| 53:                    if gender is masculine then |
| 54:                        modifiedVerb = ﺕ + verbWithNoY |
| 55:                    else |
| 56:                        modifiedVerb = ﺕ + verbWithNoY + ﻳ |
| 57:                    end if |
| 58:                case dual |
| 59:                    modifiedVerb = ﺕ + verbWithNoY + ان |
| 60:                case plural |
| 61:                    if gender is masculine then |
| 62:                        modifiedVerb = ﺕ + verbWithNoY + ون |
| 63:                    else |
| 64:                        modifiedVerb = ﺕ + verbWithNoY + ﻦ |
| 65:                    end if |
| 66:        case 3$^{rd}$ person |
| 67:            switch Number do |
| 68:                case singular |
| 69:                    if gender is masculine then |
| 70:                        modifiedVerb = presentVerb |
| 71:                    else |
| 72:                        modifiedVerb = ﺕ + verbWithNoY |
| 73:                    end if |
| 74:                case dual |
| 75:                    if gender is masculine then |
| 76:                        modifiedVerb = presentVerb + ا |
| 77:                    else |
| 78:                        modifiedVerb = ﺕ + verbWithNoY + ان |
| 79:                    end if |
| 80:                case plural |
| 81:                    if gender is masculine then |
| 82:                        modifiedVerb = verbWithNoY + ون |
| 83:                    else |
| 84:                        modifiedVerb = ن + verbWithNoY + ن |
| 85:                    end if |
| 86: case future |
| 87:    switch subject do |
| 88:        case 1$^{st}$ person |
| 89:            switch Number do |
| 90:                case singular |
| 91:                    modifiedVerb = ﺳ + verbWithNoY |
| 92:                case dual or plural |
| 93:                    modifiedVerb = ﺳﻨ + verbWithNoY |
| 94:        case 2$^{nd}$ person |
| 95:            switch Number do |
| 96:                case singular |
| 97:                    if gender is masculine then |
| 98:                        modifiedVerb = ﺳﺕ + verbWithNoY |
| 99:                    else |
| 100:                       modifiedVerb = ﺳﺕ + verbWithNoY + ﻳ |
| 101:                   end if |
| 102:               case dual |
| 103:                   modifiedVerb = ﺳﺕ + verbWithNoY + ان |
| 104:               case plural |
| 105:                   if gender is masculine then |
| 106:                       modifiedVerb = ﺳﺕ + verbWithNoY + ون |
| 107:                   else |
| 108:                       modifiedVerb = ﺳﺕ + verbWithNoY + ن |
| 109:                   end if |
| 110:       case 3$^{rd}$ person |
| 111:           switch Number do |
| 112:               case singular |
| 113:                   if gender is masculine then |
| 114:                       modifiedVerb = ﺳ + presentVerb |
| 115:                   else |
| 116:                       modifiedVerb = ﺳﺕ + verbWithNoY |
| 117:                   end if |
| 118:               case dual |
| 119:                   if gender is masculine then |
| 120:                       modifiedVerb = ﺳ + presentVerb + ا |
| 121:                   else |
| 122:                       modifiedVerb = ﺳﺕ + verbWithNoY + ان |
| 123:                   end if |
| 124:               case plural |
| 125:                   if gender is masculine then |
| 126:                       modifiedVerb = ﺳ + verbWithNoY + ون |
| 127:                   else |
| 128:                       modifiedVerb = ﺳﺕ + presentVerb + ن |
| 129:                   end if |

Some advantages of the disclosed subject matter include helping integrate the deaf/hearing impaired population with the larger community. Some implementations can include a bidirectional machine translation system between Arabic and ArSL. Input to the translation system can include Arabic text in a modern standard Arabic system. In some implementations, machine translation from Arabic to ArSL can include translating almost all of the Arabic sentence structures into ArSL.

Other advantages include representing the output of Arabic to ArSL system textually using gloss annotations and visually using a sequence of images. Some implementations of the disclosed translation systems can be used to translate messages, addresses, and educational materials into ArSL without involving expert translators.

The input text can be text-generated from speech or text recognition systems. It can also be used with smart phones by translating the incoming messages into ArSL. The proposed gloss annotation system helps in signs generation using Avatar. The gloss annotation system helps in representing the ArSL textually. This will help in integrating the sign language in the education material.

Still other advantages include translating sign words resulting from ArSL recognition into Arabic. Some implementations can include translating a sequence of Arabic words resulting from ArSL recognition systems into sentence meeting the grammar and structure of Arabic, which can help in using the ArSL recognition systems in different disciplines such as schools, airports, and hospitals.

Figure 22:
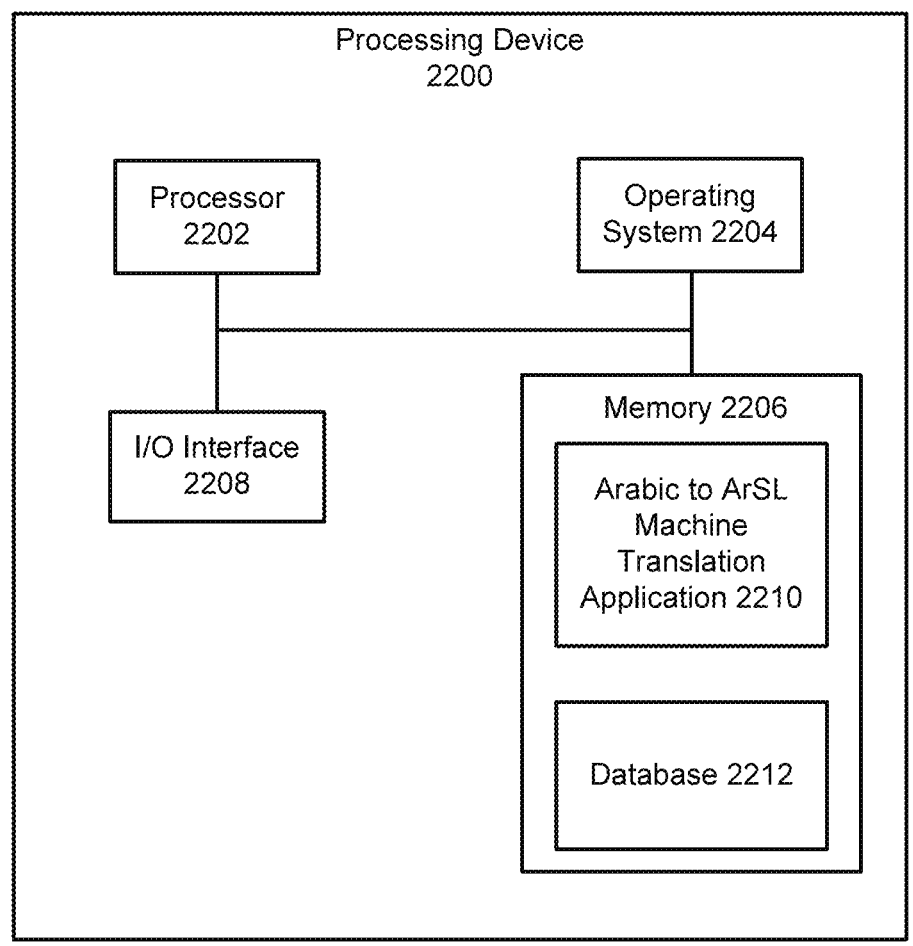
FIG. 22 is a diagram of an example processing device for machine translation in accordance with some implementations.

FIG. 22 is a block diagram of an example processing device 2200 which may be used to implement one or more features described herein. In one example, device 2200 may be used to implement a computer device including an Arabic to ArSL machine translator as described herein, and perform appropriate method implementations described herein. Device 2200 can be any suitable computer system, server, or other electronic or hardware device. For example, the device 2200 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 2200 includes a processor 2202, an operating system 2204, a memory 2206, and input/output (I/O) interface 2208.

Processor 2202 can be one or more processors and/or processing circuits to execute program code and control basic operations of the device 2200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 2206 is typically provided in device 2200 for access by the processor 2202, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 2202 and/or integrated therewith. Memory 2206 can store software operating on the device 2200 by the processor 2202, including an operating system 2204, one or more applications 2210, and a database 2212. In some implementations, applications 2210 can include instructions that enable processor 2202 to perform the functions described herein.

For example, application 2210 can include an Arabic to ArSL machine translator as described herein. Any of software in memory 2204 can alternatively be stored on any other suitable storage location or computer-readable medium. In addition, memory 2204 (and/or other connected storage device(s)) can store language translation information, and other instructions and data used in the features described herein. Memory 2204 and any other type of storage (magnetic disk, optical disk, magnetic tape, or other tangible media) can be considered "storage" or "storage devices."

I/O interface 2208 can provide functions to enable interfacing the processing device 2200 with other systems and devices. For example, network communication devices, storage devices (e.g., memory and/or database), and input/output devices can communicate via interface 2208. In some implementations, the I/O interface 2208 can connect to interface devices including input devices (keyboard, pointing device, touchscreen, microphone, camera, scanner, etc.) and/or output devices (display device, speaker devices, printer, motor, etc.).

For ease of illustration, FIG. 22 shows one block for each of processor 2202, memory 2206, I/O interface 2208, and software block 2210. These blocks may represent one or more processors or processing circuitries, operating systems, memories, I/O interfaces, applications, and/or software modules. In other implementations, device 2200 may not have all of the components shown and/or may have other elements including other types of elements instead of, or in addition to, those shown herein.

In general, a computer that performs the processes described herein can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed. A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

What is claimed is:

1. A method comprising:
receiving, at a processor, an electronic representation of a first sentence in a first written language;
programmatically performing, using the processor, a morphological analysis of the first sentence to generate a morphological result;
programmatically performing, using the processor, a syntactical analysis of the morphological result to generate a syntactic analysis result;
generating, using the processor, a first dependency tree corresponding to the first sentence in the first written language based on the syntactic analysis result;
receiving, at a second language generation module of the processor, the first dependency tree, one or more transformation rules, a second language dictionary, and a synonym dictionary;
generating, using the second language generation module of the processor, a second dependency tree based on the first dependency tree, one or more transformation rules, the second language dictionary, and the synonym dictionary; and
generating a second sentence in a second written language and a sign language sequence based on the second dependency tree.

2. The method of claim 1, wherein the first written language is Arabic and the second written language is a gloss notation representation of Arabic Sign Language (ArSL).

3. The method of claim 1, wherein the sign language sequence includes one or more images representing an Arabic Sign Language (ArSL) sequence.

4. The method of claim 1, wherein the morphological result includes words of the first sentence along with tagging information associated with one or more of the words of the first sentence.

5. The method of claim 1, wherein the syntactic analysis result includes a syntax tree.

6. The method of claim 1, wherein the second language dictionary includes an Arabic Sign Language (ArSL) dictionary.

7. The method of claim 1, wherein the synonym dictionary includes a semantic database of Arabic words grouped into one or more sets of synonyms.

8. The method of claim 1, wherein generating the second sentence includes applying one or more transfer rules to map the first written language to the second language.

9. A system comprising:
one or more processors coupled to a non-transitory computer readable medium having stored thereon software instructions that, when executed by the one or more processors, cause the one or more processors to perform operations including:
receiving, at the one or more processors, an electronic representation of a first sentence in a first written language;
programmatically performing, using the one or more processors, a morphological analysis of the first sentence to generate a morphological result;
programmatically performing, using the one or more processors, a syntactical analysis of the morphological result to generate a syntactic analysis result;
generating, using the one or more processors, a first dependency tree corresponding to the first sentence in the first written language based on the syntactic analysis result;
receiving, at a second language generation module of the one or more processors, the first dependency tree, one or more transformation rules, a second language dictionary, and a synonym dictionary;
generating, using the second language generation module of the one or more processors, a second dependency tree based on the first dependency tree, one or more transformation rules, the second language dictionary, and the synonym dictionary; and
generating, using the one or more processors, a second sentence in a second written language and a sign language sequence based on the second dependency tree.

10. The system of claim 9, wherein the first written language is Arabic and the second written language is a gloss notation representation of Arabic Sign Language (ArSL).

11. The system of claim 9, wherein the sign language sequence includes one or more images representing an Arabic Sign Language (ArSL) sequence.

12. The system of claim 9, wherein the morphological result includes words of the first sentence along with tagging information associated with one or more of the words of the first sentence.

13. The system of claim 9, wherein the syntactic analysis result includes a syntax tree.

14. The system of claim 9, wherein the second language dictionary includes an Arabic Sign Language (ArSL) dictionary.

15. The system of claim 9, wherein the synonym dictionary includes a semantic database of Arabic words grouped into one or more sets of synonyms.

16. The system of claim 9, wherein generating the second sentence includes applying one or more transfer rules to map the first written language to the second language.

17. The system of claim 16, wherein the transfer rules map Arabic to Arabic sign language.

* * * * *